US012646280B1

(12) United States Patent
McMahon et al.

(10) Patent No.: US 12,646,280 B1
(45) Date of Patent: ***Jun. 2, 2026

(54) ITEM-IDENTIFYING CARTS

(71) Applicant: Amazon Technologies, Inc., Seattle, WA (US)

(72) Inventors: Nicholas McMahon, Bolton, MA (US); Matthew Clark Webster, Lincoln, RI (US); Robert P. Irwin, Natick, MA (US); Jonathan E. Cohn, Acton, MA (US); Jacob A. Siegel, Southborough, MA (US); Charles H. Wood, Boston, MA (US); Jeremy Samuel De Bonet, Southborough, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/485,858

(22) Filed: Oct. 12, 2023

Related U.S. Application Data

(63) Continuation of application No. 17/208,236, filed on Mar. 22, 2021, now Pat. No. 11,820,414, which is a
(Continued)

(51) Int. Cl.
G06V 10/141 (2022.01)
B62B 3/14 (2006.01)
(Continued)

(52) U.S. Cl.
CPC .......... G06V 10/141 (2022.01); B62B 3/1416 (2013.01); B62B 3/1424 (2013.01);
(Continued)

(58) Field of Classification Search
CPC .. G06Q 20/208; G06Q 20/18; G06Q 20/3274; G06Q 20/4014; G06Q 30/0635;
(Continued)

(56) References Cited

U.S. PATENT DOCUMENTS 8,930,065 B2   1/2015 Argue et al.
10,507,992 B2   12/2019 Tackett et al.
(Continued)

OTHER PUBLICATIONS

Office Action for U.S. Appl. No. 16/586,242, mailed on Jun. 24, 2020, Mcmahon, "Item-Identifying Carts", 8 Pages.
(Continued)

*Primary Examiner* — Daniel Previl
(74) *Attorney, Agent, or Firm* — Kilpatrick Townsend & Stockton LLP

(57) ABSTRACT

This disclosure is directed to an item-identifying, mobile cart that may be utilized by a user in a materials handling facility to automatically identify a user operating the cart and items that the user places into a basket of the cart. In addition, the cart may update a virtual shopping cart of the identified user to include items taken by the user. The mobile cart may include multiple imaging devices and oriented such that their respective optical axes are directed towards an interior of a perimeter of the top of the basket, and above the top of the basket. The mobile cart may also include an imaging device oriented away from the basket such that a user operating the mobile cart may scan a user identifier using this imaging device to enable recognition of the user.

20 Claims, 15 Drawing Sheets

Related U.S. Application Data continuation of application No. 16/586,242, filed on Sep. 27, 2019, now Pat. No. 10,953,906.

(51) Int. Cl.
| | |
|---|---|
| *B62B 5/00* | (2006.01) |
| *G06V 20/52* | (2022.01) |
| *G06V 20/64* | (2022.01) |

(52) U.S. Cl.
CPC ............ *B62B 5/0096* (2013.01); *G06V 20/52* (2022.01); *G06V 20/64* (2022.01)

(58) Field of Classification Search
CPC ............ G06Q 30/0601; G06Q 10/087; G06Q 20/204; G06Q 30/06; G06Q 30/0631; G06Q 30/0639; G06Q 10/00; G06Q 20/00; G06Q 30/00; G06Q 40/00; G06Q 50/00; G06Q 90/00; G06Q 99/00; G06Q 2220/00; G06Q 2230/00; G06Q 2240/00; G06Q 2250/00; G07G 1/0072; G07G 1/0081; G07G 1/0054; G07G 3/006; G07G 1/00; G07G 3/00; G07G 5/00; A47F 9/048; A47F 1/00; A47F 3/00; A47F 5/00; A47F 7/00; A47F 8/00; A47F 9/00; A47F 10/00; A47F 11/00; A47F 13/00; B62B 3/1416; B62B 3/1428; B62B 3/1424; B62B 5/0096; B62B 1/00; B62B 3/00; B62B 5/00; B62B 7/00; B62B 9/00; B62B 11/00; B62B 13/00; B62B 15/00; B62B 17/00; B62B 19/00; B62B 2202/00; B62B 2203/00; B62B 2204/00; B62B 2205/00; B62B 2207/00; B62B 2206/00; B62B 2301/00; B62B 2501/00; G06V 20/52; G06V 10/25; G06V 40/20; G06V 10/768; G06V 10/774; G06V 10/776; G06V 10/87; G06V 20/50; G06V 30/19153; G06V 40/10; G06V 10/00; G06V 20/00; G06V 30/00; G06V 40/00; G06V 2201/00; G06F 18/24; G06F 18/214; G06F 18/285; G06F 1/00; G06F 3/00; G06F 5/00; G06F 7/00; G06F 8/00; G06F 9/00; G06F 11/00; G06F 12/00; G06F 13/00; G06F 15/00; G06F 16/00; G06F 17/00; G06F 18/00; G06F 21/00; G06F 30/00; G06F 40/00; G06F 2101/00; G06F 2111/00; G06F 2113/00; G06F 2115/00; G06F 2117/00; G06F 2119/00; G06F 2123/00; G06T 2207/30196; G06T 2207/30241; G06T 7/248; G06T 7/74; G06T 2207/20081; G06T 2207/30244; G06T 7/70; G06T 7/75; G06T 1/00; G06T 3/00; G06T 5/00; G06T 7/00; G06T 9/00; G06T 11/00; G06T 12/00; G06T 13/00; G06T 15/00; G06T 17/00; G06T 19/00; G06T 2201/00; G06T 2200/00; G06T 2207/00; G06T 2210/00; G06T 2211/00; G06T 2213/00; G06T 2215/00; G06T 2219/00; H04N 23/54; H04N 7/188; H04N 1/00; H04N 3/00; H04N 5/00; H04N 7/00; H04N 9/00; H04N 11/00; H04N 13/00; H04N 17/00; H04N 19/00; H04N 21/00; H04N 23/00; H04N 25/00; H04N 2101/00; H04N 2201/00; H04N 2209/00; H04N 2213/00; G01G 15/00; G01G 19/4144; G01G 19/52; G01G 23/01; G01G 23/015; G01G 23/37; G01G 1/00; G01G 3/00; G01G 5/00; G01G 7/00; G01G 11/00; G01G 9/00; G01G 13/00; G01G 17/00; G01G 19/00; G01G 21/00; G01G 23/00
USPC .... 340/568.5, 438, 439, 506, 539.1, 539.21, 340/539.22, 555, 568.1, 568.7, 572.1, 340/5.91–5.92, 825.36
See application file for complete search history.

(56) References Cited

U.S. PATENT DOCUMENTS

| | | | | |
|---|---|---|---|---|
| 10,953,906 | B1* | 3/2021 | McMahon ............ | B62B 3/1424 |
| 2010/0087241 | A1* | 4/2010 | Nguyen .............. | G06F 3/04886 |
| | | | | 463/17 |
| 2015/0058393 | A1* | 2/2015 | Smith ..................... | H04L 67/10 |
| | | | | 709/201 |
| 2015/0095189 | A1 | 4/2015 | Dharssi et al. | |
| 2017/0169440 | A1 | 6/2017 | Dey et al. | |
| 2017/0357939 | A1 | 12/2017 | Jones et al. | |
| 2018/0053231 | A1 | 2/2018 | Clark et al. | |
| 2018/0165670 | A1 | 6/2018 | Bacallao | |
| 2018/0276480 | A1* | 9/2018 | Peterson .............. | G06V 40/103 |
| 2018/0330196 | A1* | 11/2018 | Chaubard .............. | G06F 15/76 |
| 2019/0057435 | A1 | 2/2019 | Chomley et al. | |
| 2019/0147615 | A1* | 5/2019 | Fujiwara ................. | G10L 15/02 |
| | | | | 382/103 |
| 2019/0236583 | A1* | 8/2019 | Hagen .................. | G06Q 20/047 |
| 2019/0318417 | A1* | 10/2019 | Gumaru ............ | G06Q 30/0635 |
| 2019/0333039 | A1* | 10/2019 | Glaser .................. | G06Q 20/202 |
| 2020/0182634 | A1* | 6/2020 | Karceski ................ | G01S 17/86 |
| 2021/0027360 | A1* | 1/2021 | Shmueli ................ | G06F 1/163 |
| 2022/0130528 | A1 | 4/2022 | Matityaho | |

OTHER PUBLICATIONS

Office Action for U.S. Appl. No. 17/208,236, mailed on Sep. 14, 2022, McMahon, "Item-Identifying Carts" 8 pages.

* cited by examiner

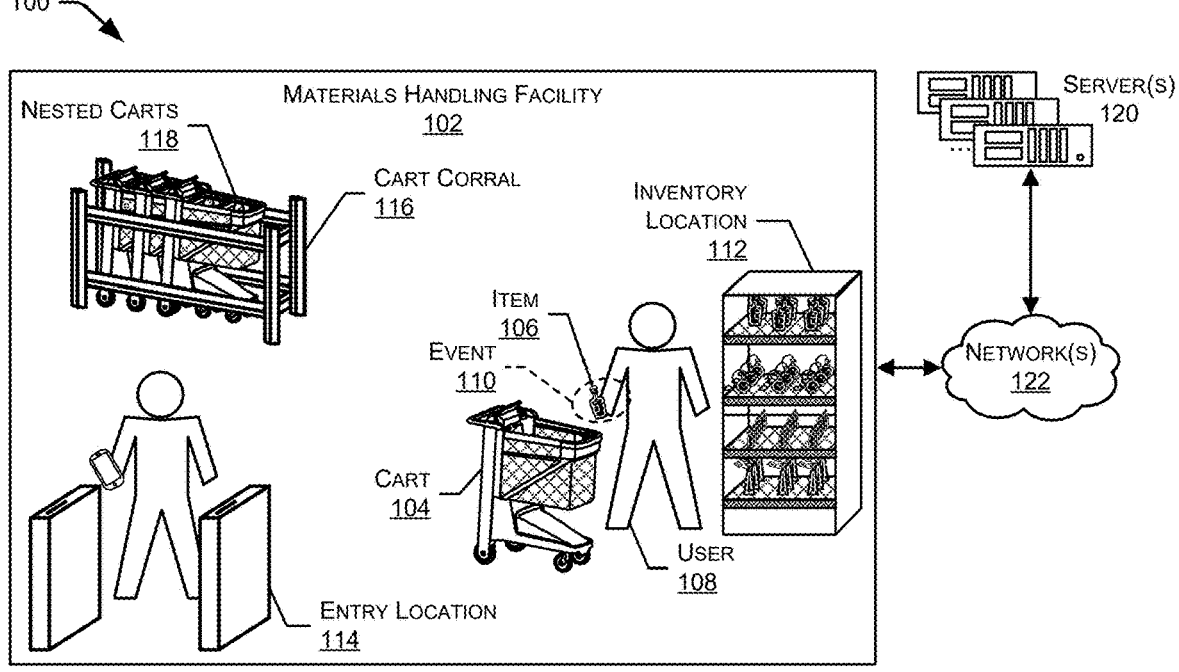
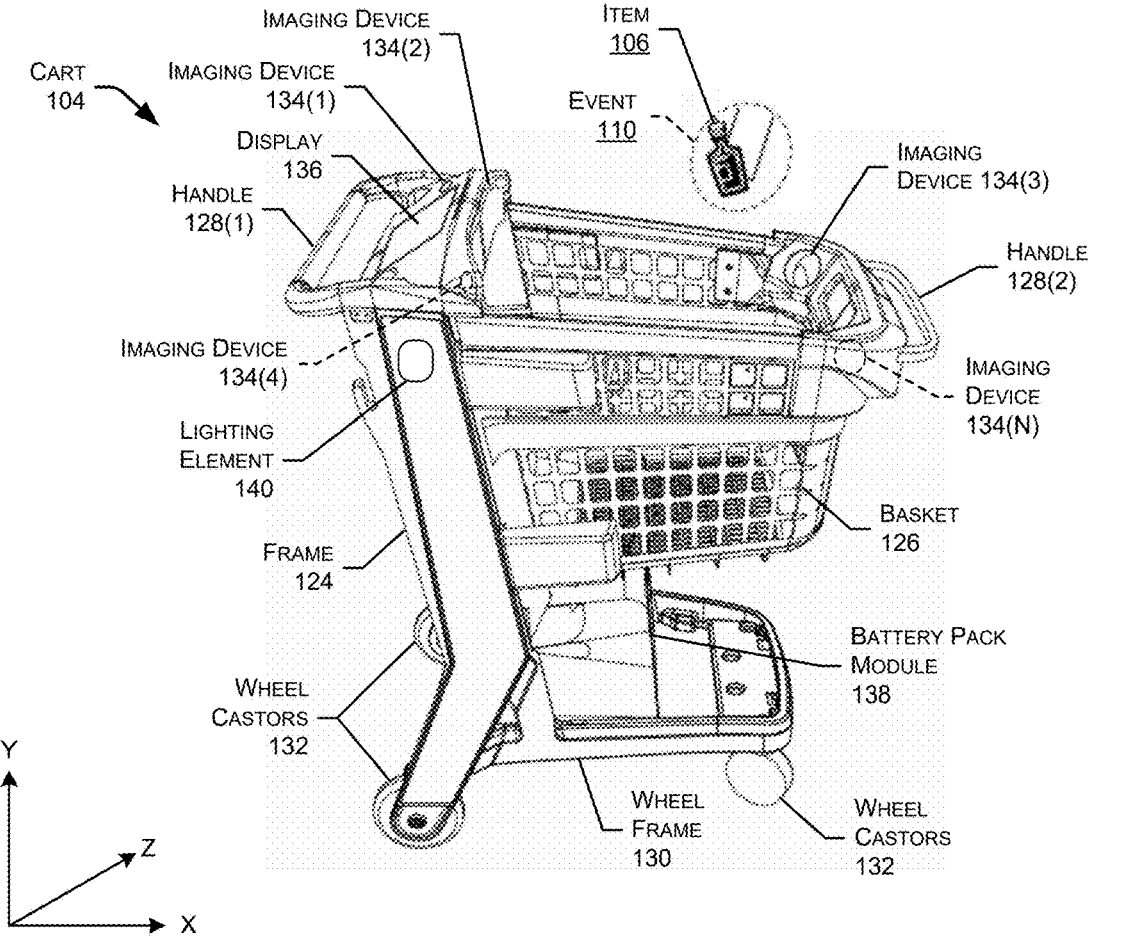
FIG. 1

CART
104

IMAGING DEVICE
134(2)

IMAGING DEVICE
134(1)

DISPLAY
136

LIGHT SOURCE(S)
202

BAG CLIP
208(2)

IMAGING
DEVICE 134(3)

LIGHTING
ELEMENT
140

CADDY
204(1)

WEIGHT
SENSOR(S)
206

BAG CLIP
208(1)

CADDY
204(2)

RFID
ANTENNA(S)
210

CART
302

LIGHTING
ELEMENT
310

LIGHT SOURCE(S)
308

OVER-THE-BASKET
ELEMENT
304

IMAGING DEVICE
306

Figures 6A, 6B:
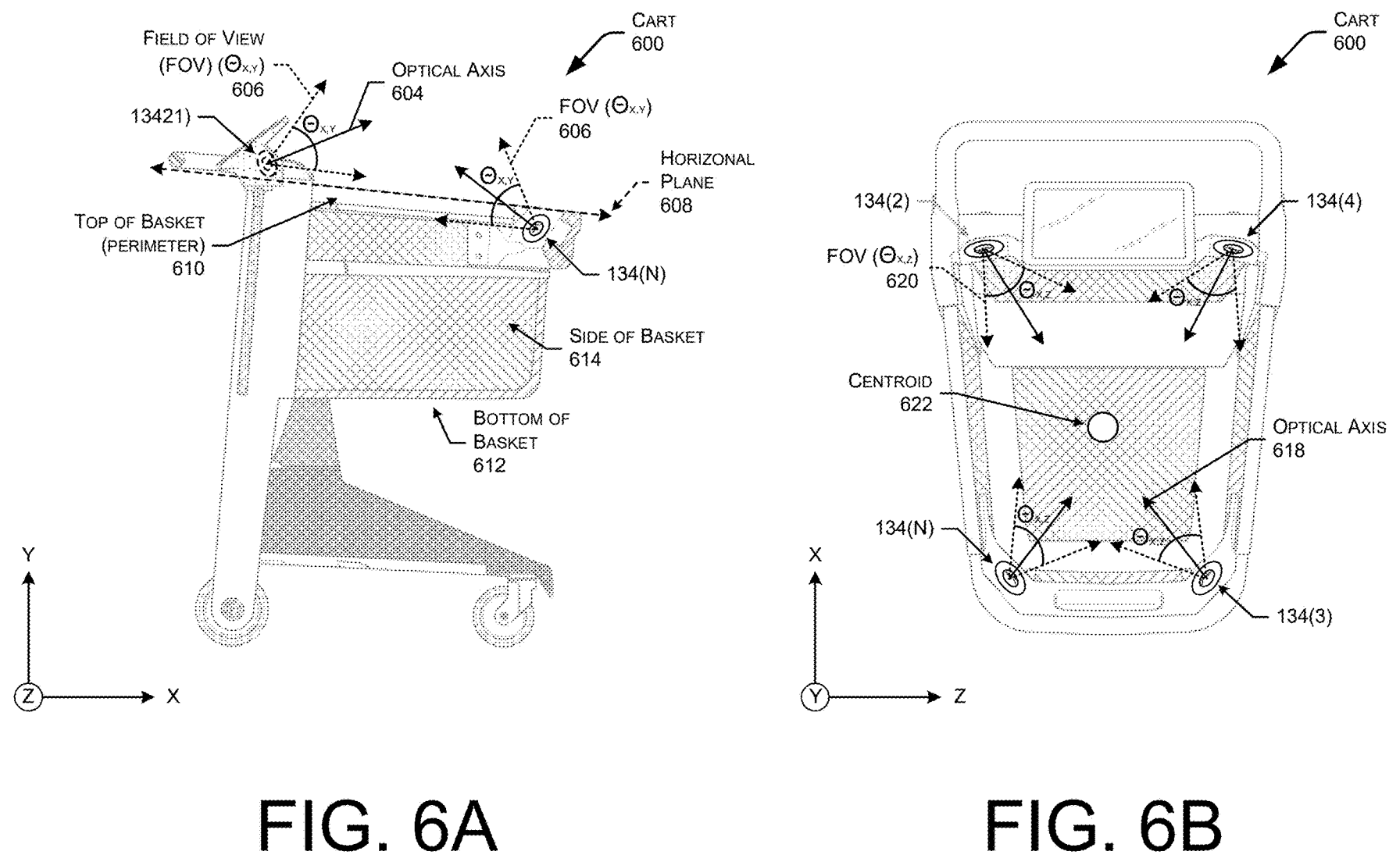

CART 600

134(4)

OPTICAL AXIS 618

134(3)

134(2)

FOV ($\Theta_{x,z}$) 620

CENTROID 622

CART 600

HORIZONAL PLANE 608

FOV ($\Theta_{x,y}$) 606

134(N)

SIDE OF BASKET 614

BOTTOM OF BASKET 612

OPTICAL AXIS 604

FIELD OF VIEW (FOV) ($\Theta_{x,y}$) 606

13421)

TOP OF BASKET (PERIMETER) 610

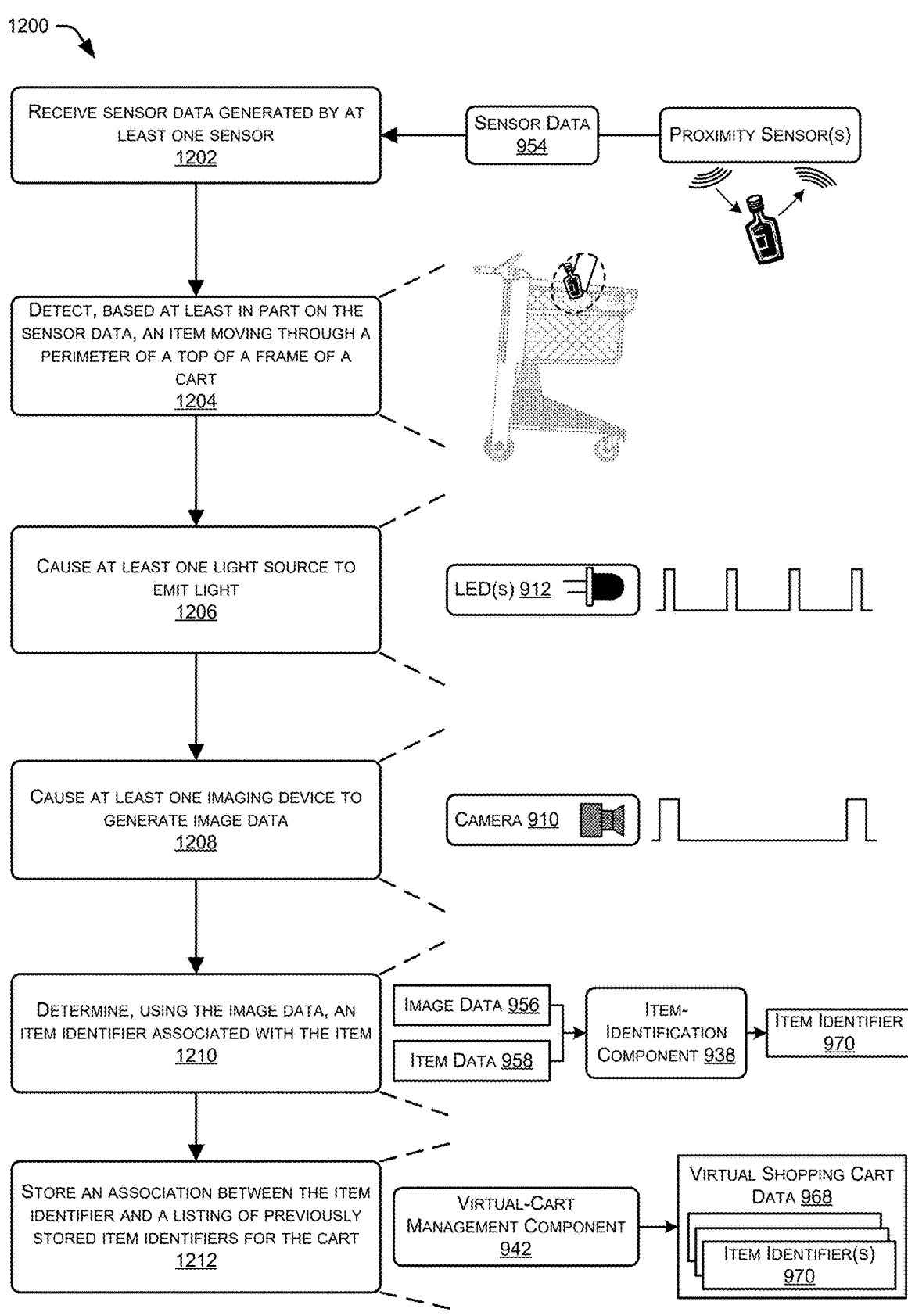

RECEIVE SENSOR DATA GENERATED BY AT LEAST ONE SENSOR
1202

SENSOR DATA
954

PROXIMITY SENSOR(S)

DETECT, BASED AT LEAST IN PART ON THE SENSOR DATA, AN ITEM MOVING THROUGH A PERIMETER OF A TOP OF A FRAME OF A CART
1204

CAUSE AT LEAST ONE LIGHT SOURCE TO EMIT LIGHT
1206

LED(S) 912

CAUSE AT LEAST ONE IMAGING DEVICE TO GENERATE IMAGE DATA
1208

CAMERA 910

DETERMINE, USING THE IMAGE DATA, AN ITEM IDENTIFIER ASSOCIATED WITH THE ITEM
1210

IMAGE DATA 956

ITEM DATA 958

ITEM-IDENTIFICATION COMPONENT 938

ITEM IDENTIFIER
970

STORE AN ASSOCIATION BETWEEN THE ITEM IDENTIFIER AND A LISTING OF PREVIOUSLY STORED ITEM IDENTIFIERS FOR THE CART
1212

VIRTUAL-CART MANAGEMENT COMPONENT
942

VIRTUAL SHOPPING CART DATA 968

ITEM IDENTIFIER(S)
970

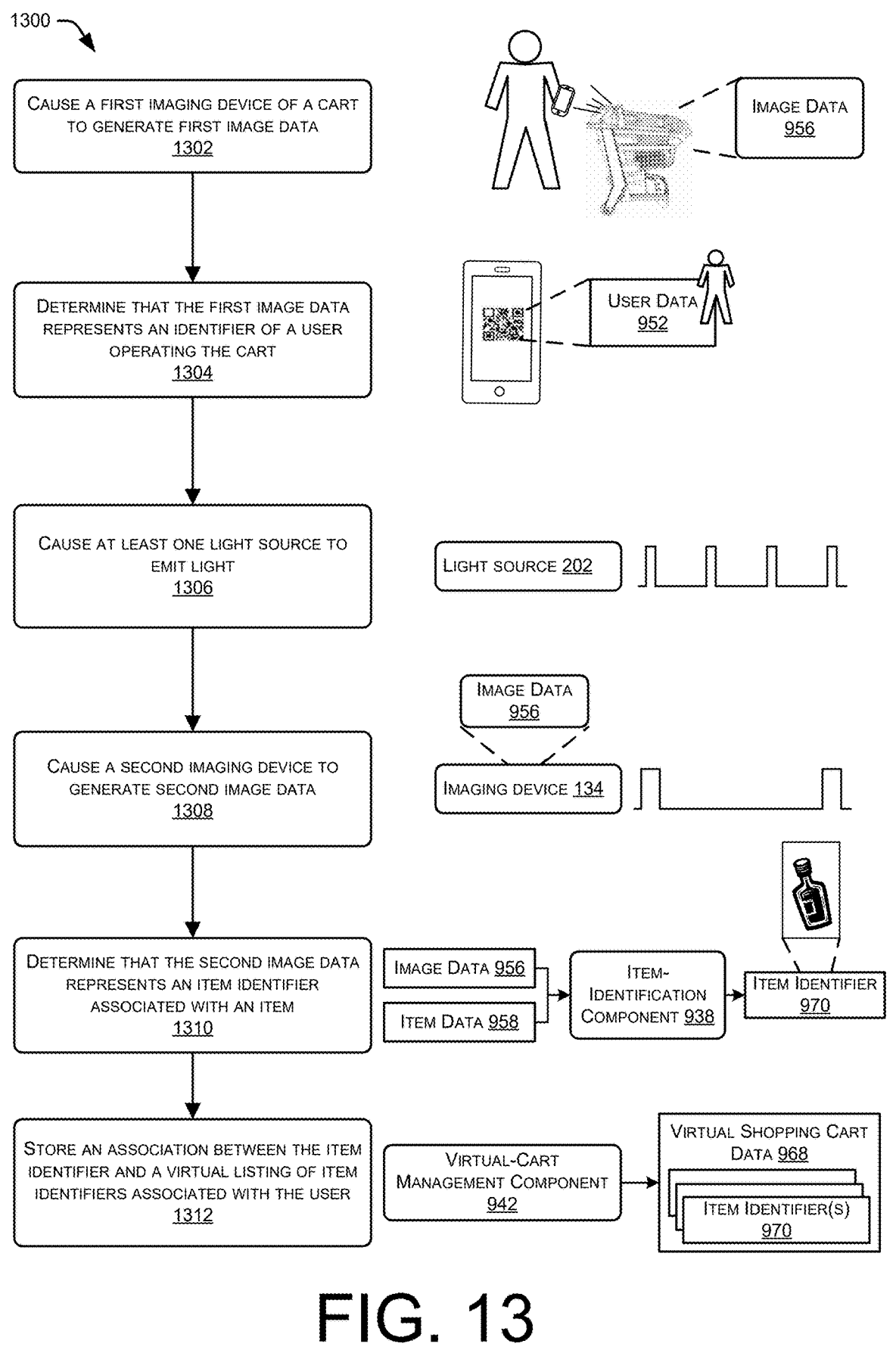

CAUSE A FIRST IMAGING DEVICE OF A CART TO GENERATE FIRST IMAGE DATA
1302

IMAGE DATA
956

DETERMINE THAT THE FIRST IMAGE DATA REPRESENTS AN IDENTIFIER OF A USER OPERATING THE CART
1304

USER DATA
952

CAUSE AT LEAST ONE LIGHT SOURCE TO EMIT LIGHT
1306

LIGHT SOURCE 202

CAUSE A SECOND IMAGING DEVICE TO GENERATE SECOND IMAGE DATA
1308

IMAGE DATA
956

IMAGING DEVICE 134

DETERMINE THAT THE SECOND IMAGE DATA REPRESENTS AN ITEM IDENTIFIER ASSOCIATED WITH AN ITEM
1310

IMAGE DATA 956

ITEM DATA 958

ITEM-IDENTIFICATION COMPONENT 938

ITEM IDENTIFIER
970

STORE AN ASSOCIATION BETWEEN THE ITEM IDENTIFIER AND A VIRTUAL LISTING OF ITEM IDENTIFIERS ASSOCIATED WITH THE USER
1312

VIRTUAL-CART MANAGEMENT COMPONENT
942

VIRTUAL SHOPPING CART DATA 968

ITEM IDENTIFIER(S)
970

FIG. 13

ITEM-IDENTIFYING CARTS

RELATED APPLICATIONS

This application claims priority to and is a continuation of U.S. patent application Ser. No. 17/208,236, filed on Mar. 22, 2021, which is a continuation of U.S. patent application Ser. No. 16/586,242, filed on Sep. 27, 2019, the entire contents of which are incorporated herein by reference.

BACKGROUND

Materials handling facilities, such as warehouses or retail stores, often provide users with carts to facilitate the processes by which the users locate, identify, retrieve, and transport items at the facilities. For example, when a user identifies an item that he or she desires on a shelf or other location within a materials handling facility, the user may remove the item from the shelf or other location, and place the item into a receptacle of a cart before the user continues to travel through the facility in search of additional items. The cart may have a durable frame or structure that is configured to travel on wheels such that users are able to fill the carts with numerous, and potentially heavy, items they desire, and use the mobile cart to transport the items around the materials handling facilitate with ease, rather than having to carry the items.

Traditionally, when the user has finished identifying and retrieving the items he or she desires, the user may transport the items in the cart to a check-out destination within the materials handling facility, such as a distribution station, a cashier, or a dedicated self-checkout stand, and transition the items to a human operator or an automated agent. Typically, the user or the human operator manually removes the items from the cart, scans or otherwise registers the items with the user, and places the items into one or more bags or other item carriers. The user may then use the bags or other item carriers to transport the items to another destination (e.g., to an automobile, workstation, or home) by manually carrying the item carriers to the other destination, or by transporting the item carriers to the destination within the cart.

Thus, retrieving items from shelves or other locations within a materials handling facility, and placing the items into bags or other carriers for transportation to their desired destination (e.g., automobile or home), may be a two-step process. First, the items must be retrieved from the shelves or other storage locations and placed into the cart, and second, the items must be removed from the cart, scanned, and placed into a bag or other item carrier. These intervening actions that are required to transition items from a shelf or other storage location into the bags or other item carrier necessarily slows the process by which items are retrieved from a materials handling facility, and tend to mitigate the advantages that carts provide.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

FIG. 1 illustrates an example environment of a materials handling facility that includes an item-identifying cart to identify items placed in, and removed from, a basket of the cart by a user. The cart uses a first camera for generating first image data for identifying a user operating the cart, as well as one or more second cameras to generate second image data depicting items placed into the cart. The cart then analyzes the first image data for identifying the user, analyzes the second image data for identifying the items, and updates a virtual shopping cart associated with the user to indicate the items added to the cart.

FIGS. 6A-6D illustrate example views of an item-identifying cart that has one or more cameras for identifying items placed in the cart.

FIG. 12 illustrates a flow diagram of an example process for identifying an item placed into an item-identifying cart.

FIG. 13 illustrates a flow diagram of another example process for identifying a user operating an item-identifying cart and an item placed into an item-identifying cart.

DETAILED DESCRIPTION

Figure 2:
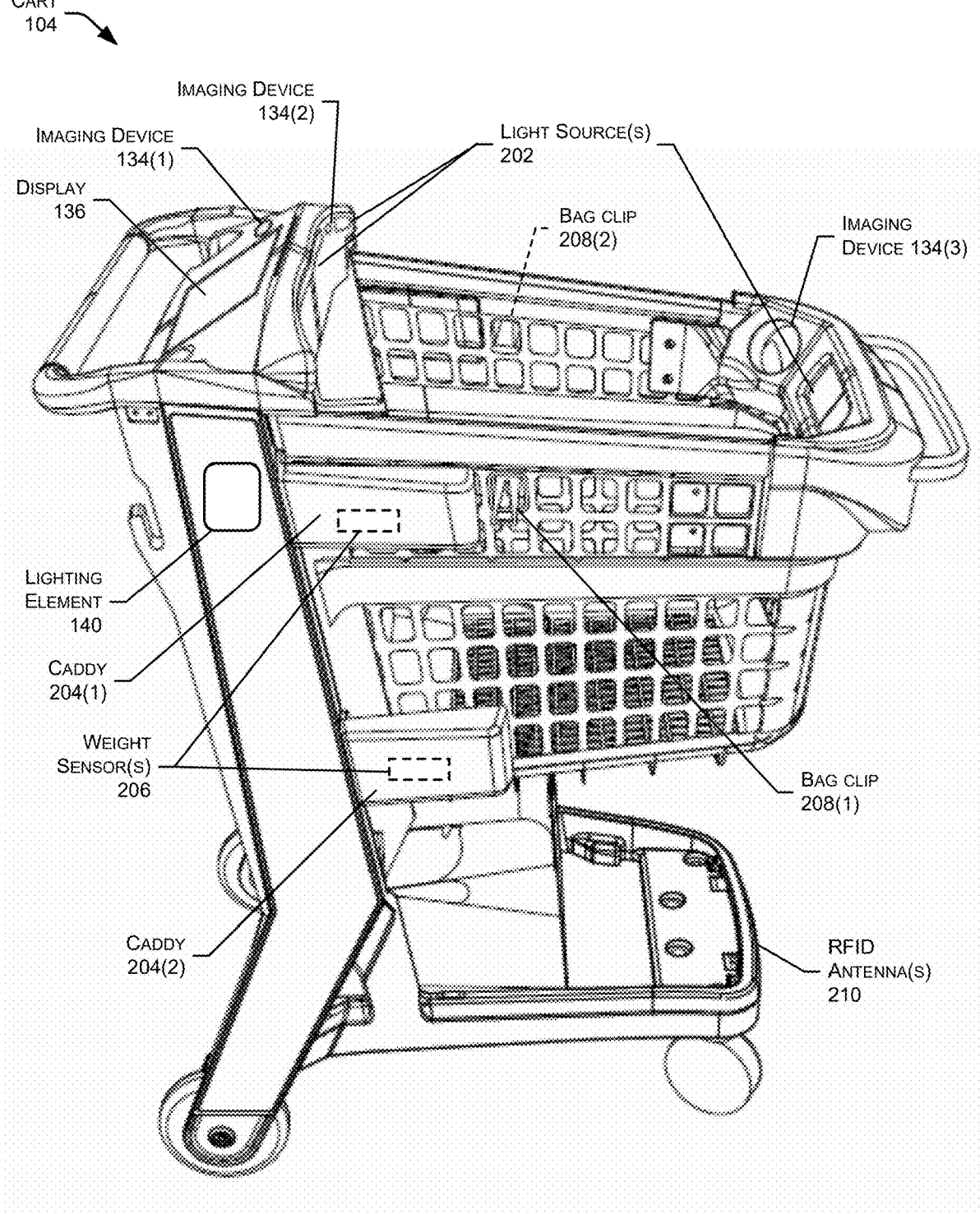
FIG. 2 illustrates the cart of FIG. 1 in further detail. As illustrated, the cart may include at least one camera for identifying a user and one or more cameras for identifying items placed into and removed from the cart. The cart may include additional components, such as one or more weight sensors on each side of the basket of the cart, a handlebar on each side of the cart for pushing and/or pulling the cart, and various other features.

This disclosure is directed to item-identifying carts that may be utilized by users in material handling facilities to automatically identify items that the users place in their carts as they move around the material handling facilities, as well as to identify the users operating the carts. Upon identifying a user operating a cart and items placed into the cart, the item-identifying cart may update a virtual shopping cart of the user to represent the items that have been placed in, or removed from, the physical cart. According to the techniques described herein, an item-identifying cart (or "smart cart") may include one or more first cameras positioned on a frame of the cart and directed substantially toward a position typically occupied by a user pushing the cart to generate first image data for identifying the user. For example, the first image data may represent an identifier associated with an account of the user displayed on a mobile device of the user (e.g., a barcode or the like displayed on a mobile phone), facial-recognition data representing the user, gesture data representing the user, and/or the like. The cart may include components for associating the first image data with the user, or the cart may send the first image data to one or more remote servers for determining this association.

In addition, the cart may include one or more second cameras positioned on the frame of the cart to generate second image data representing items that a user places in the cart, and/or removes from the cart. The cart may include one or more components that analyze the image data to determine an item identifier for the item(s) placed in the cart, or removed from the cart, and update a virtual shopping cart for the user of the cart. Once a user has finished their shopping session, the user may be able to efficiently checkout of the materials handling facility (or "facility") without having to scan or otherwise register their items with a cashier or at a designated self-checkout stand. In some examples, the user may simply depart the facility with their items and entirely avoid a traditional checkout experience of a facility, such as a grocery store. For instance, the user may have registered for a user account with the facility that is automatically charged for purchases of the items listed in a virtual shopping cart of the user that were identified by the cart during the user's shopping session.

Similar to traditional carts, such as shopping carts commonly found at grocery stores or other retail establishments, the item-identifying carts described herein may include a durable frame, including or supporting a basket, made of plastic or metal (often having four sides in a quadrilateral shape), multiple wheel castors configured to allow the cart to move on a surface, and one or more handles for a user to push and/or pull the cart around in a facility. However, the carts described herein may include additional hardware and software components that configure the carts to, among other functions, identify items placed in the carts on behalf of the users, and update virtual carts of the users to automate one or more steps of a traditional shopping experience.

For example, an item-identifying cart may include one or more cameras (or other imaging sensors), memory that stores software components for identifying users and/or items and for performing other operations for managing virtual shopping carts, at least one processor to execute the software components, and at least one battery to power the components of the cart. The camera(s) may include one or more first cameras positioned on the frame toward a location where a user would typically push the cart. The one or more first cameras may generate first image data, such as image data of a mobile phone of a user representing visual indicia (e.g., a barcode) associated with an account of the user. Thus, the user may hold up his or her mobile device representing the visual indicia such that the first camera(s) may scan or otherwise generate the first image data. The cart may then identify the account of the user using the first image data or may send the image data to a remote server(s), which may identify the user account using the first image data. Thus, items placed into the cart during a shopping session of the user operating the cart may thereafter be associated with the user account.

In some instances, the smart cart may also include one or more displays, which in some instances may reside adjacent the first camera(s) such that the display is viewable by the user operating the cart. The display may present content that is customized for the user at least partly in response to the cart identifying the user via the first image data. For example, upon the cart or the remote server(s) identifying the user operating the cart, the display may present information associated with the user, such as a shopping list of the user, a name of the user, account information associated with the account of the user, and/or the like. Furthermore, in some instances the display may present location-specific information. For example, if the cart determines that it is located in a particular location of a store, such as near a produce section, the display may present information regarding the particular location, such as cost of produce items near the cart. In another example, the display may present information such as promotions occurring on items that reside adjacent the location of the cart. In some instances, the presented promotions may also be determine based on information associated with the user (e.g., a past purchase history, preferences, etc.), current contents of the cart, and/or the like.

The smart cart may further include one or more second cameras positioned on the frame of the cart such that an optical axis of the second camera(s) is directed towards a location where second image data generated by the second camera(s) represents or captures items that are placed in the cart, and removed from the cart, by a user. The second image data may be analyzed by the software component(s) of the cart, and/or by remote server(s), using one or more image processing techniques, such as text recognition, object recognition, and/or any other technique. The software component(s) may identify or determine item identifiers for the items represented in the image data, and also determine whether the user is adding items to the cart, or removing items from the cart, and update a virtual shopping cart for the user's shopping session (e.g., add an item to a list of items to be purchased by the user, or remove an item from the list of items to be purchased). In this way, the cart may identify and track items that are retrieved from different locations within the facility, and maintain a virtual shopping cart, or virtual list, of the items selected by the user to provide a more seamless and efficient checkout experience for the user.

In some examples, the cart may have a frame that includes, or supports, a basket comprising a bottom having quadrilateral shape, one or more (e.g., four) sides protruding from the bottom to define an interior cavity, and a top having a perimeter that defines an opening to receive items placed in the interior cavity of the basket. One or more second cameras may be positioned on the basket of the cart to generate image data representing the items placed in the cart. In some examples, the cameras may be included in respective capture assemblies that include other components, such as light sources (e.g., light emitting diodes (LEDs)) to active and emit light on the items such that the items are illuminated in the image data to help improve processing of the image data to identify the items. In other instances, the cameras may reside adjacent the light sources.

Although the cameras may be positioned anywhere on the cart, in some examples, the basket of the cart may have cameras disposed proximate to each of the four corners of the perimeter of the top of the basket. In this way, the entire cart may be represented in the various field-of-views (FOVs)

of the cameras, which also may not be obstructed as the basket of the cart fills up with items. The cameras may, in some examples, be internal to the basket, or otherwise define a relatively small protrusion from the form-factor of the basket, such that the carts may still be capable of "nesting" together in a line when stored at a facility, similar to traditional shopping carts.

Due to the battery life constraints of the cart, it may be advantageous to refrain from having the cameras and/or light sources operating for large periods of time to detect an image being placed in the cart. Thus, in some examples the cart may additionally include one or more proximity sensors (e.g., time-of-flight (ToF) sensors, passive infrared (PIR) sensors, etc.) that generate sensor data to detect movement of an item in, or out, of the cart while the cameras and light sources are de-activated or in a low-power state. In this way, proximity sensors, which may consume less power than the cameras and/or light sources, may detect movement proximate the cart before the cameras and/or light sources are activated.

Thus, the cart described herein may include four cameras disposed at or proximate to the four corners of the perimeter of the basket of the cart. To detect items placed in the cart, or removed from the cart, the cameras may have respective optical axes (e.g., imaginary line along which light propagates through the capture assembly) that are oriented towards an interior of the perimeter of the top of the cart (e.g., towards the middle or centroid of the perimeter of the cart). By orienting the cameras inward with respect to the perimeter of the top of the cart, only items that pass through (e.g., in or out) of the opening of the basket may be represented in image data of the cameras.

The cameras may additionally be oriented to face in a particular vertical direction. For instance, the optical axes of the cameras may, in some examples, be directed downward towards the bottom of the basket to identify when items are placed in the bottom of the basket or taken from the bottom of the basket. For example, some of the carts described herein may include an over-the-basket structural element that couples to a left side and a right side of frame, with a middle portion of this structural element including a camera having an FOV directed substantially downwards into the basket. In addition, this over-the-basket element further include one or more light sources (e.g., LEDs) directed downwards and, in some instances, one or more lighting elements that a user or associate of the facility may selectively turn on to indicate different states of the cart, such as a state in which a user is requesting assistance, a state in which an age of the user is to be verified prior to sale of an item placed into the cart, and/or the like.

However, because users of the carts may not need to remove items from the cart to be scanned before leaving the facility, it may be advantageous for users to place one or more bags, or other item carriers, in the cart before their shopping session. In this way, users may simply retrieve items from shelves or other storage locations during their shopping session, place the items directly into their bags/item carriers, and remove the bags/item carriers from the carts once they have finished their shopping session for a more seamless shopping experience. Accordingly, the basket of the cart may be sized such that one or more bags provided by the facility, and/or by the users themselves, fit efficiently in the bottom of the basket to help maximize storage space of the interior cavity the cart. In such examples, the bags/item carriers may at least partially occlude the FOVs of the cameras such that the items are difficult or impossible to identify using image data from the cameras. Further, in some instances, one or more bag clips may be positioned outside a left and right side of the frame, respectively, for securing one or more bags in the basket. For example a first strap of a bag may extend over the top of the frame and may attach to a first bag clip on the outside of a left side of the frame, while another strap of the bag may extend outside the basket and attach to a second bag clip outside a right side of the frame. Thus, a user may place items into the bag and, upon completing the shopping session, may remove the straps from the respective bag clips to acquire the items. Again, the bag may reside in the basket in a way that does not occlude the FOVs of the cameras directed substantially towards the interior of the basket.

In some examples the optical axes of the cameras may be directed upward relative to the top of the basket of the cart. For example, the top of the basket of the cart may be disposed in a substantially horizonal plane. The optical axes of the cameras may be directed along the horizontal plane, or upward relative to the horizontal plane, such that the proximity sensors detect the items, and the cameras generate image data representing the items, while the items are at or above the top of the basket (and prior to being placed in a bag or other item carrier). Accordingly, the optical axis of the four example cameras may be directed towards an interior of the perimeter of the top of the basket (e.g., towards a middle or centroid of the perimeter of the basket), and upward relative to a horizontal plane in which the top of the basket is disposed. In this way, the FOVs for each of the cameras may at least partially overlap at a location above, and potentially central to, the perimeter of the top of the cart to define a "sweet spot" or "target zone" where items are detected and/or captures by all four of the cameras.

To utilize a smart cart as described above, a user may have registered for a user account with an operator of the facility to utilize various automated management services provided by an operator of the facility. For instance, the user may have registered for a user account to automate payments made for items taken by the user and included a payment means (e.g., credit card, bank account number, etc.), and may have also provided an identification means such that the facility, or carts, can recognize the user. For instance, the user may have registered to identify themselves to the cart using any identification technique, such as presenting an identification means to the first camera/scanner positioned on the frame of the cart (e.g., presenting a driver's license, presenting a facility-issued card, presenting a user identifier via a mobile phone, etc.), speaking a predefined utterance (e.g., a name of the user, a predefined keyword, etc.), and/or looking into the first camera for facial recognition. Once a user has identified themselves to a smart cart, the user may begin a shopping session where the smart cart identifies and track items retrieved by the user and placed in the smart cart.

In examples where the smart cart includes proximity sensors, the smart cart may continuously operate the proximity sensors to detect movement of items above the top of the cart. The proximity sensors may generate sensor data that indicates whether an item or object is with a threshold range of distances from the top of the cart (e.g., within 6 inches, within 1 foot, within 2 feet, etc.). The sensor data may be analyzed to detect an item above the perimeter of the top of the cart and trigger the light sources to begin illuminating light and the cameras to begin generating image data. The image data generated by the second camera(s) may be analyzed by the software components to determine whether or not an item is being placed in the cart or removed from the cart. For instance, the image data may represent, over time, movement of the item into the cart, or out of the cart.

Additionally, the image data may be analyzed using various techniques to determine an item identifier. Various techniques may be utilized to process image data for identifying the item identifier of the item, such as text recognition, object recognition, and/or other techniques. Upon determining the item identifier, such as determining that the item corresponds to "Strawberry Yogurt," the software components on the cart may store an indication that the item identifier was added to the cart, or removed from the cart, and update a virtual shopping cart accordingly.

After the user has moved throughout the materials handling facility and selected the items they desire to purchase or otherwise take from the facility, the user may end the shopping session in various ways. For instance, the user may return the cart to a cart corral, provide input to the cart indicating an end of the shopping session (e.g., utterance, utilize a user interface element on a touch display, etc.), or simply remove their bags or other item carriers from the cart and leave the facility. After the user has ended their shopping session, the list of item identifiers in the virtual shopping cart may be uploaded to one or more remote servers that manage user accounts for users of the facility. The servers may charge the appropriate user account for the listing of the items in the virtual shopping cart that the user took from the facility.

Although some of the techniques described below are performed locally on the cart, in other examples, some or all of the techniques may be performed by one or more backend devices or servers associated with the facility. For instance, the sensor data and/or image data may be collected at the cart and sent over network(s) to backend devices at the facility, or server devices located remote from the facility, to be processed remotely. However, in some instances it may be advantageous for at least some of the processing to be performed on the cart to reduce latency in identifying items placed in the cart. For instance, it may be advantageous to have low latency when requesting that a user provide feedback to help identify an item recently placed in the cart, rather than the user continuing their shopping session and being asked later about an item. Further, while various techniques described below are with reference to purchasing items in a retail facility, the techniques are generally applicable to any materials handling facility in which a user may place items in a cart. For example, although the techniques described herein are primarily with reference to identifying items placed in a cart by a user for the purpose of identifying a user account to charge for items selected from a materials handling facility, the techniques are equally applicable to any industry in which user recognition may be helpful. For instance, the idem-identifying cart may be implemented for distribution centers where employees collect items from various locations to be shipped through the mail system.

The following description describes use of the techniques within a materials handling facility. The facility described herein may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. In other implementations, the techniques described herein may be implemented in other facilities or situations.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example environment 100 of a materials handling facility 102 that includes an item-identifying cart 104 to identify items 106 placed in, and removed from, a basket of the cart 104 by a user 108. The cart may generates first image data for identifying a user and generate second image data depicting the item 106. In addition, the cart may analyze the second image data to identify an item identifier for the item 106, determine the event 110 involving the item (e.g., add to cart, remove from cart, multiple items, quantity of items, etc.) and update a virtual shopping cart associated with the identified user 108 using the item identifier.

As FIG. 1 depicts, the user 108 may have engaged in a shopping session in the materials handling facility 102. For instance, the user 108 may have selected an item 106 from an inventory location 112 (e.g., shelf, aisle, etc.) and placed the item 106 in the cart 104 (e.g., shopping cart). The inventory location 112 may house one or more different types of items 106 and the user 108 may pick (i.e., take, retrieve, etc.) one of these items 106.

As illustrated, the materials handling facility 102 (or "facility") may have one or more entry locations 114, such as lanes. The entry location 114 may be defined by a gate in some examples and may include a movable barrier to control movement of users 108. For example, the gate may include computer-controlled panels that may be closed to impede passage of the users 108 or opened to permit passage of the user 108. Upon entering a facility 102, a user 108 may desire to utilize a cart 104 for their shopping session to transport items 106 around the facility 102 during their shopping session. In such examples, the user 108 may approach a cart corral 116, or other locations, at which carts 104 are stored. In some examples, the cart corral 116 may comprise a structure, such as an aisle, for storing nested carts 118.

Generally, two or more of the carts 104 may be configured to nest or otherwise functionality join with one another, so that the carts 104 may be easily stored in a cart corral 116, and/or transported in bulk. In some examples, the cart corral 116 may provide additional functionality beyond storage. For instance, the cart corral 116 may facilitate charging of the nested carts 118 that are in the cart corral 116. For instance, the cart corral 116 may have various electrical contacts extending along the length of a horizontal and/or vertical member of the corral 116 that, when placed in electrical contact with an electrical contact of the nested carts 118, charge one or more batteries of the nested carts 118. In other examples, power cords may extend from the cart corral 116 that may be plugged into the nested carts 118 to recharge batteries of the nested carts 118 while not in use.

To utilize a cart 104, a user 108 may approach an unused cart that is not currently engaged in a shopping session (e.g., a nested cart 118), and interact with the unused cart 104 to identify themselves to the cart 104 and begin a shopping session. For instance, the carts 104 may include a first imaging device 134(1) (e.g., an image sensor such as a camera, photodetector, or other sensing apparatus designed to read a one or two-dimensional barcode) such that when a user 108 presents a user device, or portion thereof, such as the display, to the imaging device 134(1), the cart 104 may identify the user and corresponding user account for a shopping session. Other types of interaction may be performed by a user 108 to identify themselves to a cart 104

(e.g., uttering a name or other keyword to identify the user 108, presenting the user's face for facial recognition, typing in a password or other user information into a display of the cart 104, and/or any other type of user identification technique).

Once a user has identified themselves to the cart 104, the item-identifying functionality of the cart 104 may be activated such that subsequent items 106 placed in the cart 104 will be identified by the cart 104 and added to a virtual shopping cart for the user 108. As illustrated, a user 108 may move the cart 104 around the facility 102 to one or more inventory locations 112. The user 108 may retrieve items from the inventory location 112 and place the items 106 in the cart 104. Additionally, the use 104 may retrieve items 106 from the cart 104 and put the items 106 back in an inventory location 112, such as when the user 108 changes their mind regarding their desire to purchase or otherwise acquire the item 106. The cart 104 may include various components for identifying item identifiers corresponding to the items 106 placed in the cart and maintaining a virtual shopping cart for the shopping session of the user 108.

Once the user 108 has finished their shopping session, the user 108 may end the shopping session in various ways. For instance, the user 108 may return the cart 104 to the cart corral 116, provide input to the cart 104 indicating an end of the shopping session (e.g., utterance, utilize a user interface element on a touch display, etc.), or simply remove item bags or other item carriers from the cart 104 and leave the facility 102. After the user 108 has ended their shopping session, the list of item identifiers in the virtual shopping cart may be uploaded to one or more remote servers 120, over one or more networks 122, that manage user accounts for users 108 of the facility 102. The server(s) 120 may charge the appropriate user account for the listing of the items in the virtual shopping cart that the user took from the facility 102. For instance, the server(s) 120 may be configured to determine or generate information indicative of a cost of the items 106 picked by the user 108. Additionally, the server(s) 120 may store payment information (e.g., credit card information, bank account information, etc.) for each user account. In this way, when the user 108 finished their shopping session and the cart 104 sends the listing of item identifiers in the virtual shopping cart over the network(s) 122 to the server(s) 120, the server(s) 120 may be configured to determine a cost or price for all of the listed item identifiers, and charge the user via their payment information for the items 106 selected during their shopping session. In this way, the user 108 need not go through steps of a traditional check-out experience (e.g., waiting in line for a cashier, scanning items with the cashier, paying for items at the cashier, etc.).

The network(s) 122 may include private networks such as an institutional or personal intranet, public networks such as the Internet, or a combination thereof. The network(s) 122 may utilize wired technologies (e.g., wires, fiber optic cable, and so forth), wireless technologies (e.g., radio frequency, infrared, acoustic, optical, and so forth), or other connection technologies. The network(s) 122 is representative of any type of communication network, including one or more of data networks or voice networks. The network(s) 122 may be implemented using wired infrastructure (e.g., copper cable, fiber optic cable, and so forth), a wireless infrastructure (e.g., cellular, microwave, satellite, etc.), or other connection technologies.

The cart 104 may include communication interface(s) such as devices configured to couple to personal area networks (PANs), wired and wireless local area networks (LANs), wired and wireless wide area networks (WANs), and so forth. For example, the communication interfaces may include devices compatible with Ethernet, Wi-Fi™, and so forth. In some examples, the communication interface(s) may encode the data prior to sending over the network(s) 122 according to the type of protocol or standard being used. As noted above, in some examples, the servers 120 may perform some or all of the operations described below as being performed by the cart 104. While the servers 120 are illustrated as being in a location outside of the facility 102, in other implementations, at least a portion of the servers 122 may be located at the facility 102.

As illustrated, the cart 104 may generally include or be formed of a frame 124, a basket 126, a first handle 128(1) for pushing the cart 104, a second handle 128(2) for pulling the cart, a wheel frame 130, and one or more wheel castors 132 to enable movement of the cart 104 on a surface. The frame 124, the basket 126, the handles 128, and the wheel frame 130) may be formed from any suitable materials such as plastics, wood, metals, composites or any other combinations of materials. Moreover, frame 124, the basket 126, the handle 128, and the wheel frame 130 may take any form.

The basket 126 may generally be part of the frame 124 and/or supported by the frame 124 (e.g., be welded, fused, adhered, bolted, screwed, molded, or otherwise joined to the frame 124). In some examples, the basket 126 may comprise a grid or lattice-like structure (e.g., a honey combed arrangement or framework) having one or more bars or members that are welded, fused, adhered, bolted, screwed, molded, stitched or otherwise joined in a substantially perpendicular alignment with respect to one another. The basket 126 may generally be any shape that defines an interior cavity, or receptacle, for receiving items 106 that are placed in the cart 104. The basket 126 may comprise a bottom, multiple sides protruding from the bottom, and a top. As illustrated, the bottom basket 126 may be in the shape of a quadrilateral such that there are four sides protruding from the bottom of the basket 126. Similarly, the top of the basket 126 may be defined according to the quadrilateral shape and have a perimeter with four corners. The perimeter of the top of the basket 126 may define an opening to the interior cavity (or receptacle) of the basket 126 to receive items placed inside the basket 126. In various examples, the perimeter of the top of the basket may be disposed in a substantially horizontal plane (e.g., a plane substantially along the x-axis as illustrated), and the frame 124 may include at least one vertical member that extends downward from the basket 126 to the wheel frame 130 along a substantially vertical plane (e.g., a plane substantially along the y-axis as illustrated).

The wheel frame 130 may support one or more wheel castors 132 to enable movement of the cart 104 along a surface. The wheel casters 132 include one or more wheels, axles, forks, joints or other components which enable the cart 104 to travel on various surfaces. For example, in some implementations each of the wheel casters 132 may include a single wheel provided on an axle within a fork, or two or more wheels provided on such an axle. In some other implementations, the wheel casters 132 may include two or more axles. Alternatively, in still other implementations, a single caster may be provided in lieu of the multiple wheel casters 132 shown in FIG. 1. In accordance with the present disclosure, the wheel casters 132 may operate in any manner, such as being configured to pivot or swivel, and thus automatically adjust or align with a direction of travel. In some examples, the cart 104 may be equipped with other apparatuses for enabling the cart 104 to travel on solid surfaces, including one or more wheeled components other than casters, including but not limited to omnidirectional wheels, spherical wheels or other like apparatuses. Additionally, in some other implementations, the cart 104 may include two or more skis or other runners for traveling on smooth surfaces. In still other implementations, the cart 104 may be levitated, e.g., by magnetic levitation through the use of one or more linear induction motors. Moreover, the cart 104 may be propelled or pushed by humans or autonomous mobile robots or, alternatively, by one or more motors (e.g., electric-powered or gasoline-powered).

As illustrated, the cart 104 may include a first imaging device 134(1), for identifying a user operating the cart as described above, and additional, second imaging devices 134(2), 134(3), 134(4) . . . , 134(N) that include components for use in identifying items placed in the basket 126 and removed from the basket 126. The imaging device 134(1) may, in some instances, be positioned in a manner such that an FOV of the imaging device 134(1) is away from the basket 126 and substantially towards the first handle 128(1) where a user may typically operate the cart 104. The imaging devices 134(2)-(N) may be positioned at any location on the cart 104 (e.g., in the basket 126, on the basket 126, mounted to the frame 124, mounted to the basket 126, and/or any other location), oriented to have respective FOVs for identifying events that occur within and proximate to the basket 126. In some examples, the cart 104 may include at least four of the second imaging devices 134(1), 134(2), 134(3), and 134(N) that are disposed or coupled proximate to four corners of the top of the basket 126. In some examples, one or all of the components of the second imaging devices may be disposed internal to the form factor of the basket 126 and/or frame 124, at least partially internal to the form factor of the basket 126 and/or frame 124, and/or entirely external to the form factor of the basket 126 and/or frame 124 (e.g., mounted to the cart 104). However, in the illustrated example, the second imaging devices may be disposed at locations proximate to the four corners of the top or perimeter of the basket 126/frame 124. In some instances, the less that the second imaging devices protrude from the form factor of the cart 104, the more efficiently the carts 104 may be nested with respect to each other.

As described in further detail below with respect to FIG. 2, the cart 104 may further include one or more one light sources (e.g., LED) for emitting light at or prior to the time of the second imaging devices generating second image data. The cart 104 may further include, in some instances, one or more proximity sensors (e.g., ToF sensor, PIR sensor, etc.). In some examples the proximity sensors may be activated to detect the proximity of items 106 or other objects above the top of the basket 126. The proximity sensors may be configured to generate sensor data that indicates distances between objects above the top of the basket 126 of the cart 104 and the second imaging devices. The cart 104 may include components configured to analyze the sensor data and determine that an item 106 is within some threshold distance from the top of the basket 126 and/or within the basket 126. Upon detecting an object within the threshold proximity of the basket 126 using the proximity sensor, one or more components of the cart 104 may cause the light sources (LEDs) to emit light and the second imaging devices to generate image data. In some examples, the FOVs of the second imaging devices 134(2)-(N) may each at least partially overlap at a location above the top of the basket 126 corresponding to a centroid of the quadrilateral defining the top of the basket 126. The light sources may illuminate the basket 126 and/or the area above the top of the basket 126 to illuminate items 106 being placed in the cart 104, or removed from the cart 104, to act as a "flash" for the cameras that are generating image data. The second imaging devices may generate image data for a predefined period of time and/or until the proximity sensors (or the image data itself) indicates that there is no longer an object within the threshold distance from the cart 104 or top of the cart 104.

After generating the image data, one or more components of the cart 104 may process the image data to determine an item identifier for the item(s) 106 represented in the image data, and an event 110 for the image data (e.g., addition of an item 106 to the cart, removal of an item 106 from the cart). As described in more detail below with respect to FIG. 9, the cart 104 may include component(s) to determine an item 106 identifier for the item 106 (e.g., name of the item 106, SKU number for the item 106, etc.), and determine if the item 106 is being taken from the cart 104, or added to the cart 104, based on the motion of the item 106 and the result of the movement around the cart 104 once movement is no longer detected and represented by the image data. The components of the cart 104 may then update a virtual shopping cart associated with the cart 104 that indicates a virtual listing of items 106 taken by the user 108 from the facility based on the determined event 110. In some examples, the image data may be transmitted to the server(s) 120 over the network(s) 122 where the processing may be performed.

In various examples, the cart 104 may include a display 136 to present various information in user interface(s) for the user 108 to consume. In some examples, the display 136 may comprise a touch screen to receive input from the user 108 (e.g., a selection of an item identifier to disambiguate amongst potential item identifiers). In some instances, the display 136 may present customized information to the user 108 upon identifying the user 108, such as a shopping list of the user or the like.

The cart 104 may further include a battery pack module 138 that houses one or more batteries to power the components of the cart 104. The battery pack module 138 may include rechargeable batteries. In some examples, the battery pack module 138 may be detachably coupled to the wheel frame 130 and/or the frame 124 of the cart 104 such that the battery pack module 138 may be removed and taken to a charging station. In various examples, the battery pack module 138 may include rechargeable batteries that may be charged when the cart 104 is placed in a cart corral 116 (e.g., through electrical contacts, power cords, etc.). In various examples, the frame 124 and/or basket 126 may have one or more channels (e.g., grooves, holes, paths, tunnels, etc.) through which power cables/cords may pass. In this way, power cables may be run at least partially through the channels in the frame 124 and/or basket 126 inconspicuously to provide power to the various components of the cart 104.

In some instances, the cart 104 may further include one or more lighting elements 140 disposed on the frame 124 and/or basket 126 of the cart 104. The user 108 may, in some instances, operate a controller to turn on (and off) the lighting element(s) 140 to cause the lighting element(s) to emit light. Further, in some instances the controller may enable the lighting element(s) 140 to transition between multiple light states, such as different colors, flashing effects, and/or the like. The controller operable by the user 108 may comprise functionality accessible to the user 108 via the display (e.g., one or more soft buttons for turning on and/or off the light), a physical toggle switch on the frame 124 of the cart 104, and/or the light. Further, the lighting element(s) 140 may be used to signal a predefined state of the cart 104 and/or the user 108. For example, the user 108 may turn on the lighting element(s) 140 to indicate that he or she requests assistance from an associate of the facility 102, or for any other reason. In some instances, in response to the user 108 operating a controller to request assistance, the cart 104 may perform one or more actions in addition to turning on the lighting element(s) 140. For example, the display may present content responding to this request, such as an offer to connect the user 108 with an associate of the store (e.g., in person, via I/O devices of the cart, etc.). For example, in response to requesting assistance, the cart 104 may facilitate an audio-only or an audio/video call between the user 108 and an associate of the facility using one or more I/O devices on the cart, such as the display, one or more speakers, one or more microphones, one or more cameras pointed toward the user 108 and/or the like.

In still other instances, associates of the facility may, remotely or otherwise, operate the lighting element(s) 140 to change states (e.g., turn on or off) and/or the cart 104 may include components to automatically change a state of the lighting element(s) 140. For example, upon the card identifying that an item of a predefined class of items has entered the basket, the cart 104 may cause the lighting element(s) 140 to change state (e.g., from an off state to an on state) to indicate that an additional checkout workflow may now be required. For example, if the user 108 places an item into the basket 126 that requires the purchasing user to be of a certain age (e.g., alcohol) or to have a certain prescription (e.g., medicine), the cart 104 may illuminate the lighting element(s). In some instances, the cart 104 may include a lighting element on a right side of the frame, a lighting element on a left side of the frame, and/or one or more other lighting elements in other locations on the cart 104.

FIG. 2 illustrates the cart 104 of FIG. 1 in further detail. As illustrated, the cart may include the first imaging device 134(1) for identifying a user, the one or more second imaging devices 134(2)-(N) for identifying items placed into or removed from the basket 126, the display 136 for presenting information to a user operating the cart 104, and the one or more lighting elements 140. In addition, the cart 104 may include one or more light sources 202 that function to emit light prior to and/or while the second imaging sensors 134(2)-(N) generate the second image data for identifying items placed into and removed from the basket 126. In some instances, these light sources 202 emit constant light, while in other instances the light sources 202 emit light in a strobing manner. In either of these instances, the light may be visible and/or non-visible light.

In addition, the cart may include one or more caddies, such as a caddy 204(1) and a caddy 204(2), coupled to the left and/or right side of the frame or basket of the cart 104. For example, the cart 104 may include the first and second caddies 204(1) and 204(2) on the right side of the cart, and two similarly situated caddies on the left side of the cart (not shown). Each caddy may define a receptacle (e.g., having an opening at the top) for housing one or more items therein. In some instances, the caddies may be beyond the FOV of the second imaging devices 134(2)-(N) such that the user is able to place personal items (e.g., keys, wallet, phone, etc.) into the receptacle defined by the respective caddy without the imaging devices 134(2)-(N) generating image data corresponding to this addition. In other instances, the caddies may be within the FOV of one or more of the imaging devices.

In addition, one or more of the caddies may include one or more respective weight sensors 206 for determining a current weight of the basket 126 and, thus, items in the basket 126. For example, each caddy may comprise a respective weight sensor 206 comprising a strain gauge or other sensor that continuously or periodically may be used to determine a weight of the basket and/or whether a change in weight has occurred. As illustrated, the cart 104 may include two weight sensors 206 on each side of the basket 126. Each pair of weight sensors 206 may, in some instances, reside along the same vertical axis. That is, a top weight sensor on the right side of the basket 126 may reside above a bottom weight sensor on the right side.

This weight data may be used to identify when items have been placed into or removed from the basket and, in some instances, may be used to identify items placed into or removed from the basket. For example, the weight data may be used to determine the identity of an item placed into or removed from the basket (e.g., to identify that a bottle of ketchup was placed into the basket), identify a number of instances of an item (e.g., a number of bottles of ketchup placed into the basket), to measure an amount of something (e.g. 1 pound of peanuts), and/or the like.

FIG. 2 further illustrates that the cart 104 may include one or more bag clips, such as a bag clip 208(1) on a right side of the basket 126 and a bag clip 208(2) on a left side of the basket 126. As illustrated, the bag clips 208 may reside on an outside, top portion of the basket such that a user may place a bag into the interior of the basket while securing a first strap of the bag to the first clip 208(1) and a second strap of the bag to the second clip 208(2). Thereafter, the user may place items into and/or remove items from the bag. At the end of the shopping session, the user may remove the bag containing the items from the basket (e.g., by removing the straps from the clips) and exit the facility.

FIG. 2 further illustrates that the cart 104 may include one or more RFID antenna(s) 210, which may be used for determining a location of the cart 104 within the facility 102. In some instances, the inventory locations 112 may include respective RFID tags that may be read by the RFID antennas 210 of the cart. In some instances, the cart 104, or a remote system communicatively coupled to the cart 104, may store map data that indicates associations between respective location with the facility to respective RFID tags throughout the facility. As illustrated, in some instances the RFID antennas 210 may reside near a bottom portion of the frame of the cart. In other instances, however, the RFID antennas 210 may reside at other locations on the cart 104 and/or distributed at multiple locations on the cart 104.

Figure 3:
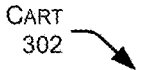
FIG. 3 illustrates an example cart that includes an over-the-basket element that may include a camera having a field-of-view into the basket of the cart for identifying items. The over-the-basket element may also couple to a lighting element configured to toggle between one or more states, such as an off state and an on state in which a user is requesting assistance.

FIG. 3 illustrates another example cart 302 that may include some or all of the features described herein. In addition, the illustrated cart 302 includes an over-the-basket element 304 that may include an imaging device 306 having a field-of-view into the basket of the cart for identifying items. That is, the imaging device 30 may couple to a bottom surface of the element 304 and may have an FOV that is directed substantially downwards into the basket. The over-the-basket element 304 may also include one or more light sources 308 configured to emit light, similar to the light sources 202 discussed above and below. These light sources may emit a constant light or may emit light according to a strobing pattern. Further, in some instances the light sources 308 and/or 202 may emit light in response to a proximity sensor detecting the presence of an item near the basket 126. In some instances, the over-the-basket structural element 304 may be detachable from the frame and/or basket of the cart, such that merchants (or users) may selectively remove the element 304 as desired.

As illustrated, the over-the-basket element 304 may further including one or more lighting elements 310 configured to toggle between one or more states, such as an off state and an on state. Similar to the lighting element 140 discussed above, a user operating the cart 302, an associate in the facility, and/or the cart 302 itself may be configured to change a state of the lighting element 310 (e.g., from an off state to an on state, from a first color, to a second color, etc.). In some instances, the lighting element 310 may emit light in response to a user operating a controller (e.g., physical switch, the display 136, etc.) to indicate that the user is requesting assistance. In another example, the lighting element 310 may indicate that the user and/or contents of the cart are subject to a particular workflow based on contents of the cart and/or the like (e.g., an age-verification workflow in which an associate of the facility is to verify an age of the use operating the cart 302 and requesting to acquire a particular item).

Figure 4:
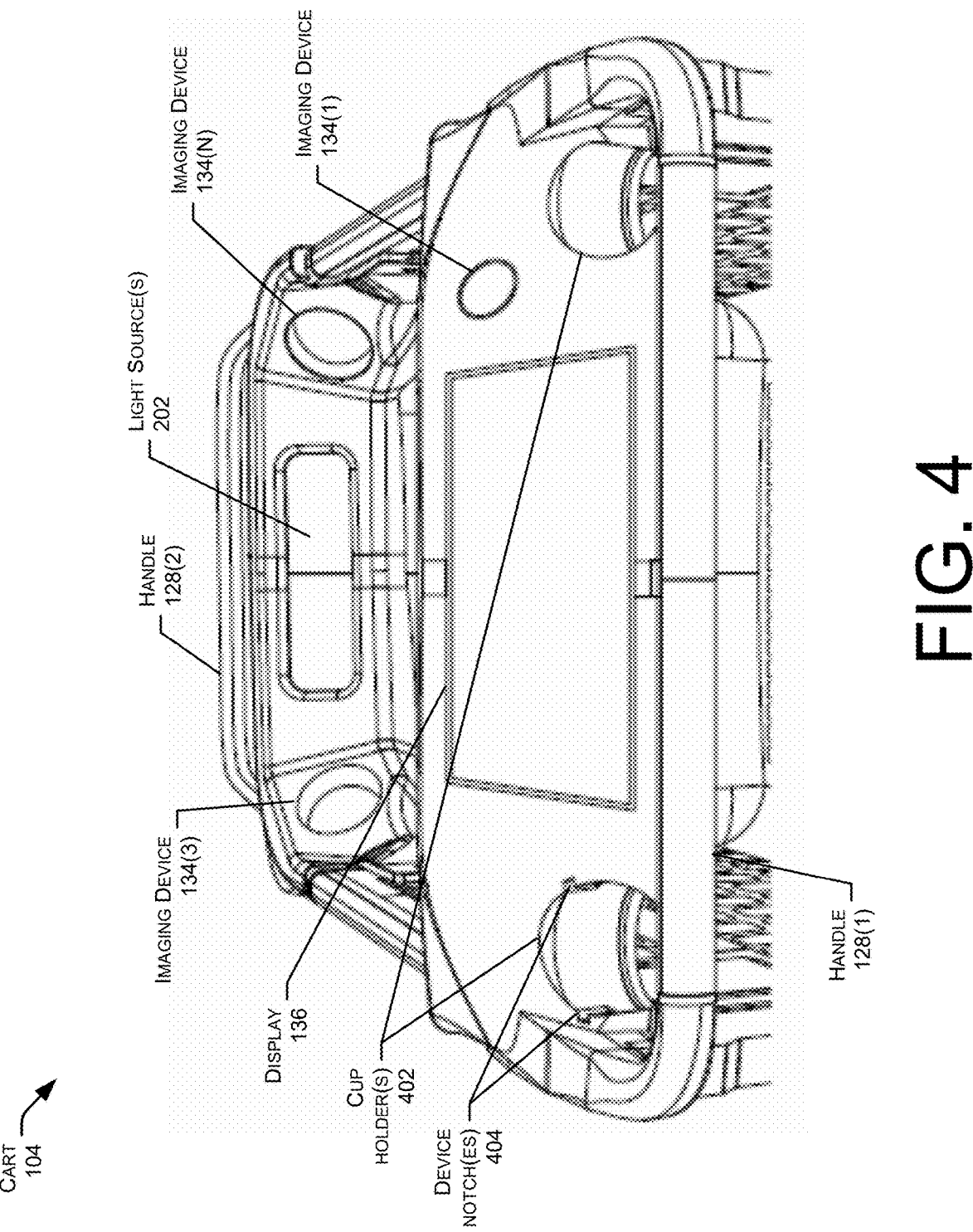
FIG. 4 illustrates an example front view of the cart. As illustrated, the cart includes a handlebar for pushing the cart, a camera for generating data for identifying a user operating the cart, and a display to present content to the user.

FIG. 4 illustrates an example front view of the cart 104. As illustrated, the cart includes the first handle 128(1) for pushing the cart 104, the second handle 128(2) for pulling the cart 104, the imaging device 134(1) for generating data for identifying a user operating the cart, the second imaging devices 134(2)-(N), and the display 136 to present content to the user operating the cart. The front view also illustrates that the cart may include the light source(s) 202 between the imaging device 134(3) and 134(N). In some instances, the cart may further include a light source to the left of the imaging device 134(3) and/or a light source to the right of the imaging device 134(N).

In addition, the cart 104 may include one or more cup holder 402 (in this example, on the left and right sides of the display 136) for holding respective cups of the user. In addition, each cup holder may include one or more device notches 404, comprising recesses of the cup holder in which a user may secure a device, such as a mobile phone or the like. That is, the device notches 404 may provide respective slots in which a user may place an electronic device, such as a phone, in a manner in which the device is secure while a display of the device is oriented towards the user operating the cart. Thus, the user, may engage in the shopping session while having a shopping list or the like displayed on a device that sits securely in the device notches 404 of the cup holder 402.

Figure 5:
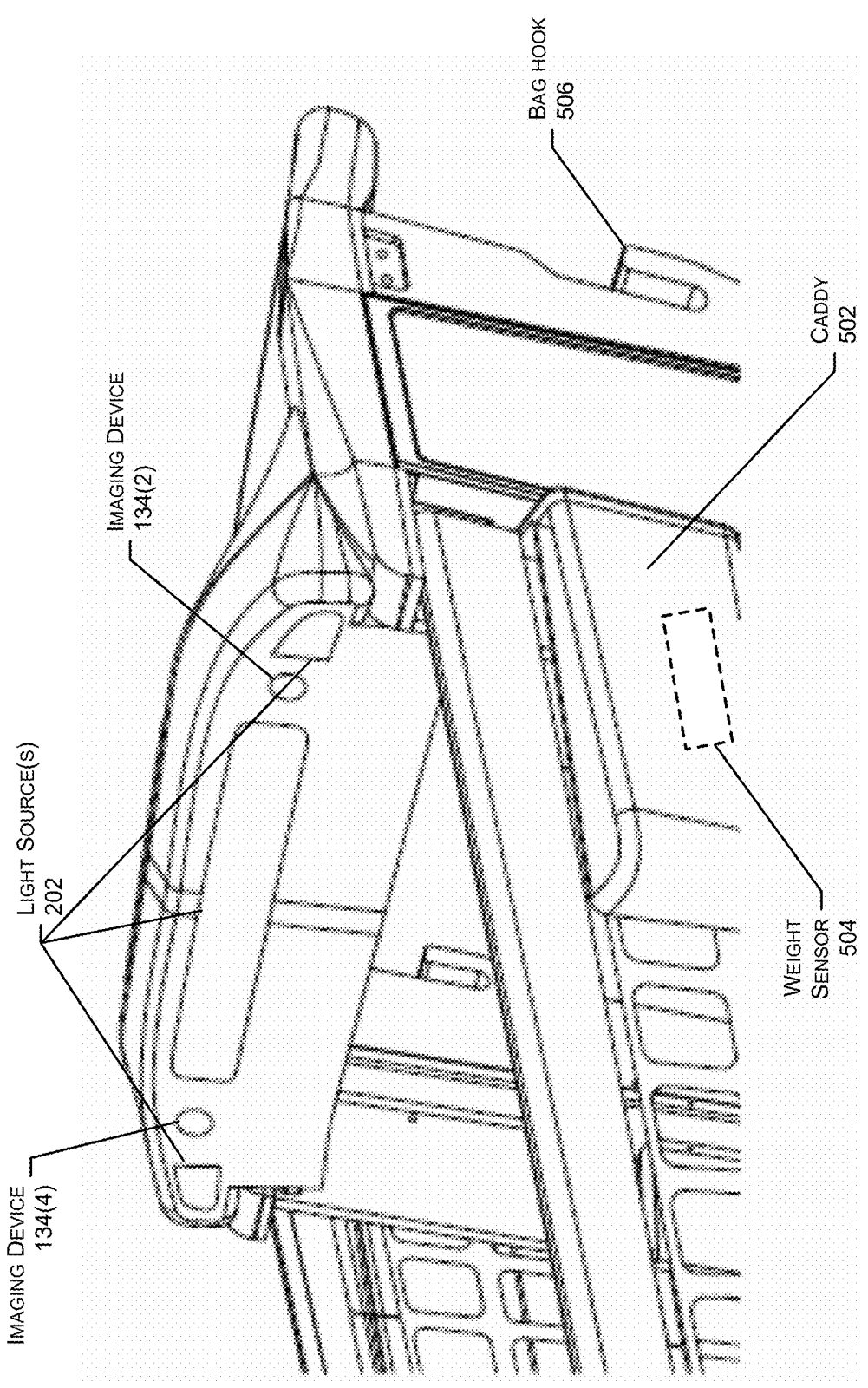
FIG. 5 illustrates a closer view of one or more cameras having a field-of-view substantially towards the basket of the cart.

FIG. 5 illustrates a closer view of one or more imaging devices 134(2) and 134(4) having an FOV substantially towards the basket of the cart. This figure also illustrates that the cart 104 may include one or more light sources 202 between the imaging devices 134(2) and 134(4), to the left of the imaging device 134(3), and/or tot the right of the imaging device 134(2). In addition. FIG. 5 illustrates an example caddy 502, which may define a receptacle for housing one or more items, as discussed above. Further, one or more weight sensors 504 may reside within or adjacent to the caddy 502 for generating weight data indicating a weight or change in weight of the basket. Finally, this figure illustrates that the frame 124 of the cart 104 may include one or more bag hooks 506, comprising hooks in which a user operating the cart 104 may secure one or more bags. In some instances, the cart 104 may include a bag hook 506 on a rear-left side of the frame (e.g., near a user operating the cart) and/or a bag hook 50 on a rear-right side of the frame.

FIG. 6A illustrates an example cross-sectional view of an item-identifying cart 600 that includes imaging device 134 for identifying items 106 placed in the cart 600. While this cart 600 may have a different form factors than other carts illustrated and described herein, characteristics of the cart 600 may be applied to the other cart form factors, and vice versa. As illustrated, the cross-section of the cart 600 is taken along a plane defined by the x-axis and y-axis along the center of the cart 600 from the back to the front of the cart 600.

In some examples, the imaging device 134(2) is positioned at a first corner of the basket 126 near the back of the cart 600. The imaging device 134(2) may have an optical axis 604 and an FOV 606 oriented along the x-y plane. The optical axis 604 of the first capture assembly 134(1) may be directed upward from a substantially horizontal plane 608 and towards the interior of the perimeter 610 of the basket 126. In some examples, the basket 126 may include a bottom of the basket 612, ones or more sides of the basket 614 protruding up from the bottom 612, and a top of the basket (perimeter) 610 that is disposed along the substantially horizontal plane 608. In some examples, the FOV 606 of each of the second imaging devices may have a lower edge that is defined according to the horizonal plane 608.

The first imaging device 134(2) may have an optical axis 604 directed upward from the substantially horizontal plane 608 and towards the interior of the perimeter 610 of the basket 126. In some examples, the FOV $(\theta_{x,y})$ 606 may be defined according to the optical axis 604 (e.g., the optical axis 604 may be approximately the middle of the FOV 606). The FOV 606 may be any FOV for of the second imaging devices (e.g., 80 degrees, 70 degrees, 45 degrees, etc.). Generally, the FOV 606 may at least partially include an area above the top of the basket 210. Similarly, another imaging device 134(4) coupled proximate to a corner of the basket 126 on the front of the cart 600. The imaging device 134(4) may have an optical axis 604 directed upward from the substantially horizontal plane 608 and towards the interior of the perimeter 610 of the basket 126. In some examples, the FOVs 606 may include an area above the top 610 of the cart 600, an area within the basket 126 of the cart, and/or a combination of above and below the top 610 of the basket 126.

FIG. 6B illustrates an example top view of an item-identifying cart 600 that has imaging devices 134(2)-(N) for identifying items 106 placed in the cart 600. As illustrated, the cart 600 is shown from a top such that the dimensions of the cart 600 are illustrated along an x-axis and a z-axis (x-z coordinate plane).

In some examples, four imaging devices 134 are positioned at four different corners of the frame 124 and/or basket 126 of the cart 600. Each of the four imaging devices 134 may include respective optical axes 618 directed inward relative to the perimeter 610 of the basket 126. Additionally, the four imaging devices 134(2)-(N) may each have FOVs $(\theta_{x,z})$ 620 that are defined according to the optical axes 618 (e.g., the optical axes 618 may be approximately the middle of the FOVs 620). The FOVs 620 may be any FOV for cameras in the imaging devices (e.g., 80 degrees, 70 degrees, 45 degrees, etc.). Generally, the FOVs 620 for each of imaging devices 134 may overlap at least partially at a centroid 622 of the frame 124 and/or basket 126 of the cart 600. The FOVs 620 may, in combination, cover all, or most, of the interior of the perimeter 610 of the basket 126 such that items 106 are detected and identified using at least one of the capture assemblies 134.

Figures 6C, 6D:
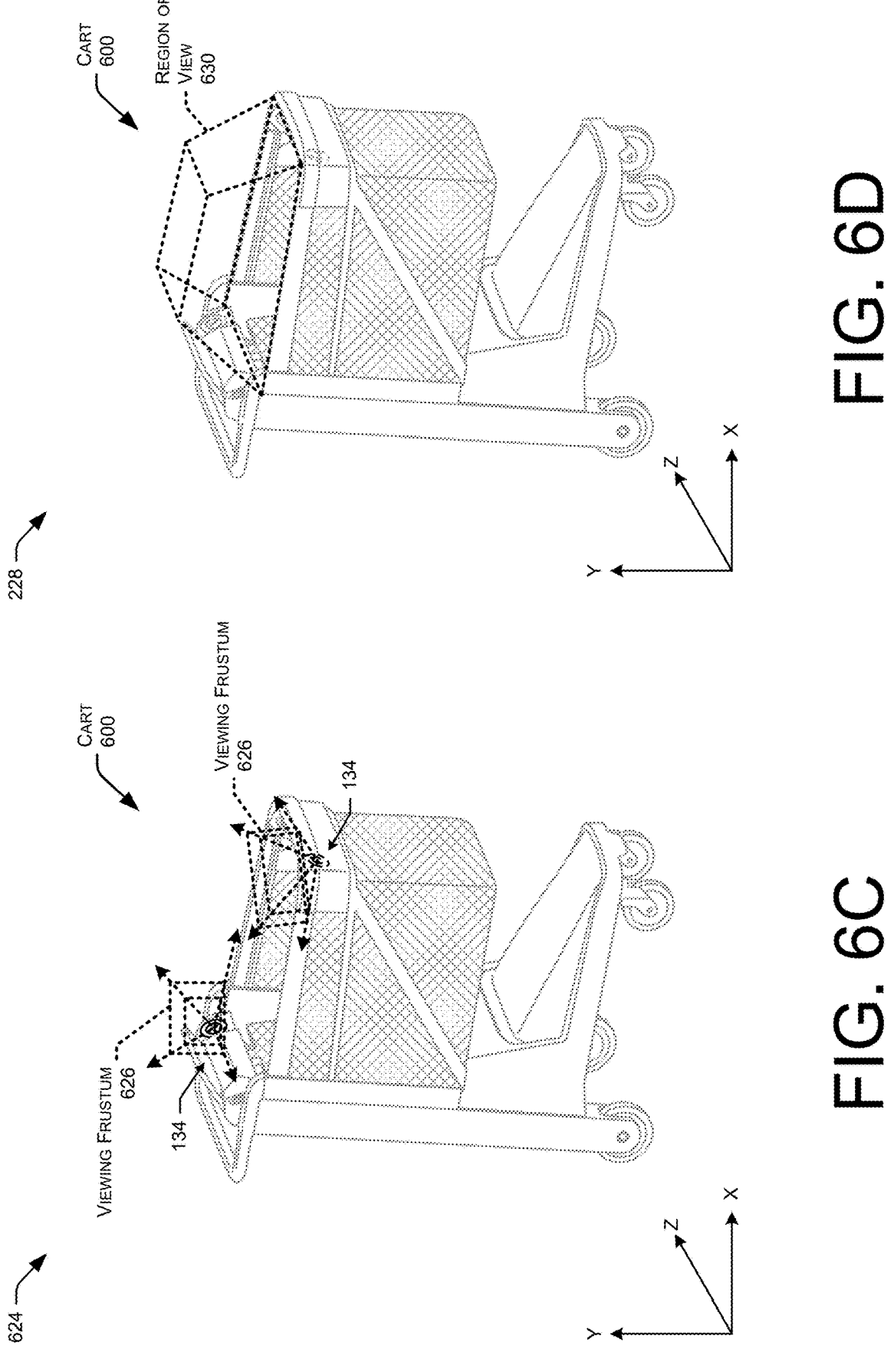

FIG. 6C illustrates an example perspective view of an item-identifying cart 600 that has imaging devices 134 for identifying items 106 placed into the cart 600. As illustrated, the cart 600 may include multiple imaging devices that have viewing frustums 626 that may be oriented in the same direction as the optical axis 604. The viewing frustums 626 may generally be the region of space in the environment of the cart 600 that is within the field of view of the camera and/or proximity sensor of the imaging devices 134. The viewing frustums 626 for each of the imaging devices 134 may be oriented inward to the basket 126 of the cart, and upward relative to the top, or perimeter, of the basket 610. The proximity sensor, if present, and imaging devices may have the same viewing frustum 626, or different viewing frustum's 626 that at least partially overlap.

FIG. 6D illustrates another example perspective view 628 of an item-identifying cart 600 that has imaging devices 134 for identifying items 106 placed into the cart 600. As shown in FIG. 6D, the viewing frustums 626 and/or FOV's 606 for each of the imaging devices 134 may generally define a region of view 630. The region of view 630 may comprise a volumetric, three-dimensional (3D) shape in which items 106 are captured in image data of the cameras, and/or detected by proximity sensors. Thus, the region of view 630 defines a volumetric region in which at least one of the cameras in a capture assembly is able to capture image data representing an item 106. Generally, the region of view 630 may encompass substantially all, or a large majority of, the perimeter of the top of the basket 610. In this way, items 106 placed in the basket 126 will be detected and have image data generated that represents the items 106 as they are being placed in the basket 126. Although illustrated as including space above the basket 126, in some examples, the region of view 630 may additionally, or alternatively, include space inside the basket 126 (e.g., downward facing cameras). In some instances, the region of view 630 defined by the cameras on the cart 104 may be the same as the region of view 630 of the proximity sensors, or different than the region of view 630 of the proximity sensors.

Figure 7:
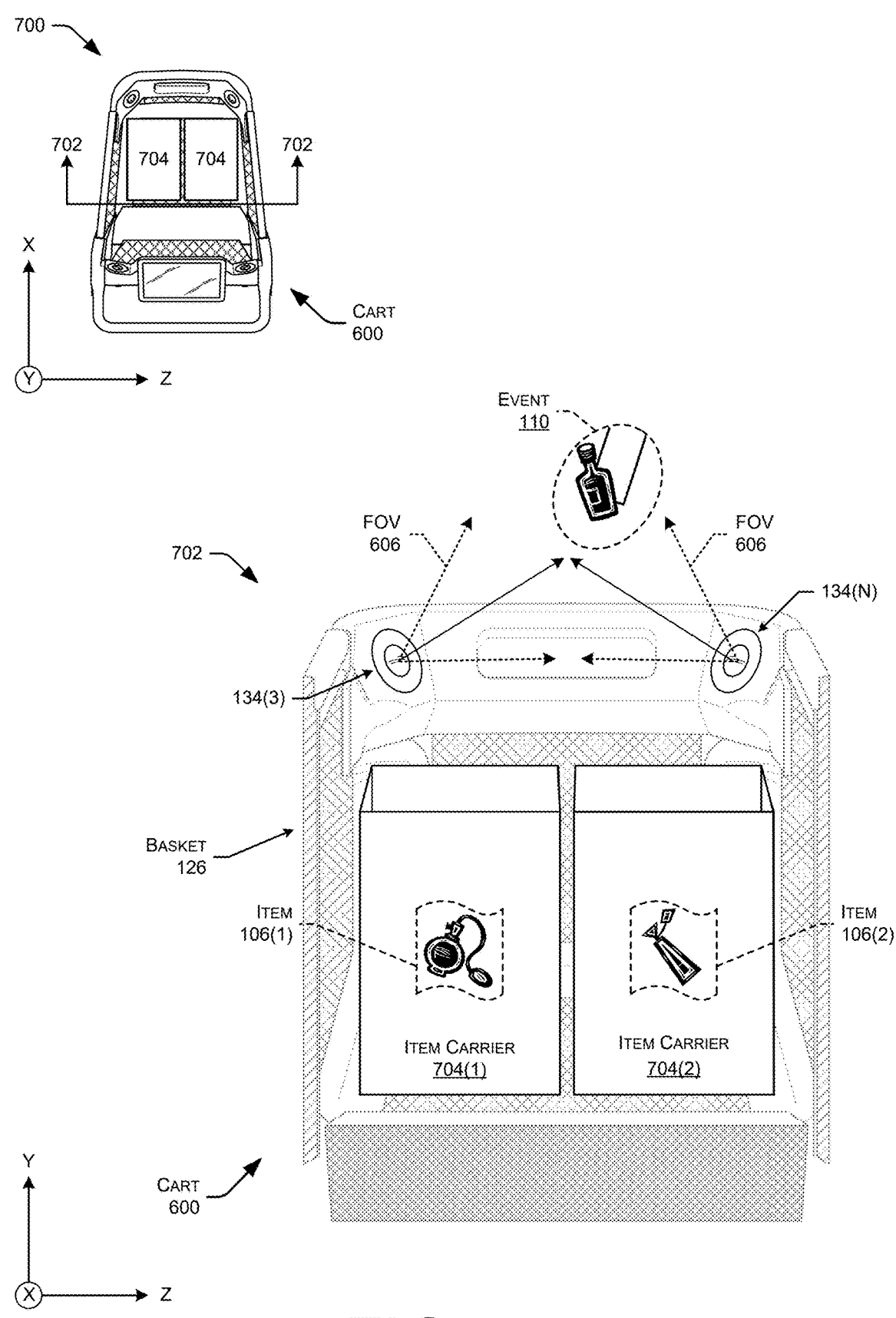
FIG. 7 illustrates another example cross-sectional view of an item-identifying cart that has item carriers placed inside the basket of the cart, and cameras that are used to identify an item being placed in the item carriers.

FIG. 7 illustrates another example of an item-identifying cart 600, including a top view 700 and a cross sectional view 702, that has item carriers 704 placed inside the basket of the cart 600, and imaging devices 134 and light sources 202 (within respective capture assemblies) that are used to identify an item being placed in the item carriers 704.

As illustrated by the top view 700, the cart 600 may include a basket that is sized to store one or more item carriers 704, such as bags (e.g., plastic bags, paper bags, etc.), boxes, user-provided item carrier, and/or any other item carrier 704. In some examples, the cart 600 may have a basket 126 that is sized to efficiently fit (e.g., minimize empty space in the basket 126) one or more of the item carriers 704. As shown in the cross-sectional view 702 of the basket 126 of the cart, the item carriers 704 may be sized such that the tops of the item carriers 704(1) and 704(2) are below the perimeter defining the top of the basket 126. In this way, the FOVs of the imaging devices 134 are not obstructed by the item carriers 704.

As shown, the item carriers 704 may have items 106 stored therein, which are no longer visible to cameras due to their placement in the item carriers 704. Accordingly, if the imaging devices 134 had FOVs 606 that generated image data of the interior of the basket 126, the items 106 may not be visible due to occlusion from the item carriers 704. However, to identify the items 106 placed in a cart 600, the imaging devices 134 need to be able to view the items 106, which would prevent users 108 from being able to place item carriers 704 in their carts 104. Thus, by having FOVs 606 that at least partly face upward relative to the top of the perimeter of the basket 126, the items 106 that are placed in the basket are identifiable in image data generated by the imaging devices 134. Additionally, users 108 are able to place their item carriers 704 directly in the basket 126 to receive items 106 as the user 108 shops, thereby reducing friction in the traditional-checkout experience by having to take items out of the cart 600 to be bagged or otherwise placed in item carriers 704.

In some examples, the basket 126 (or other location on the cart 600) may include one or more hooks to help support the item carriers 704. For instance, the item carriers 704 may be a cloth, or other material, with handles or holes. To help hold the item carriers 304 open and/or up, the basket 126 may include hooks near the top or perimeter and/or hooks on the outside of the basket 126 to hook into holes of the item carriers 304 and/or to hold up handles of the item carriers 704, such as the bag clips 208(1)-(2) discussed above.

Figure 8:
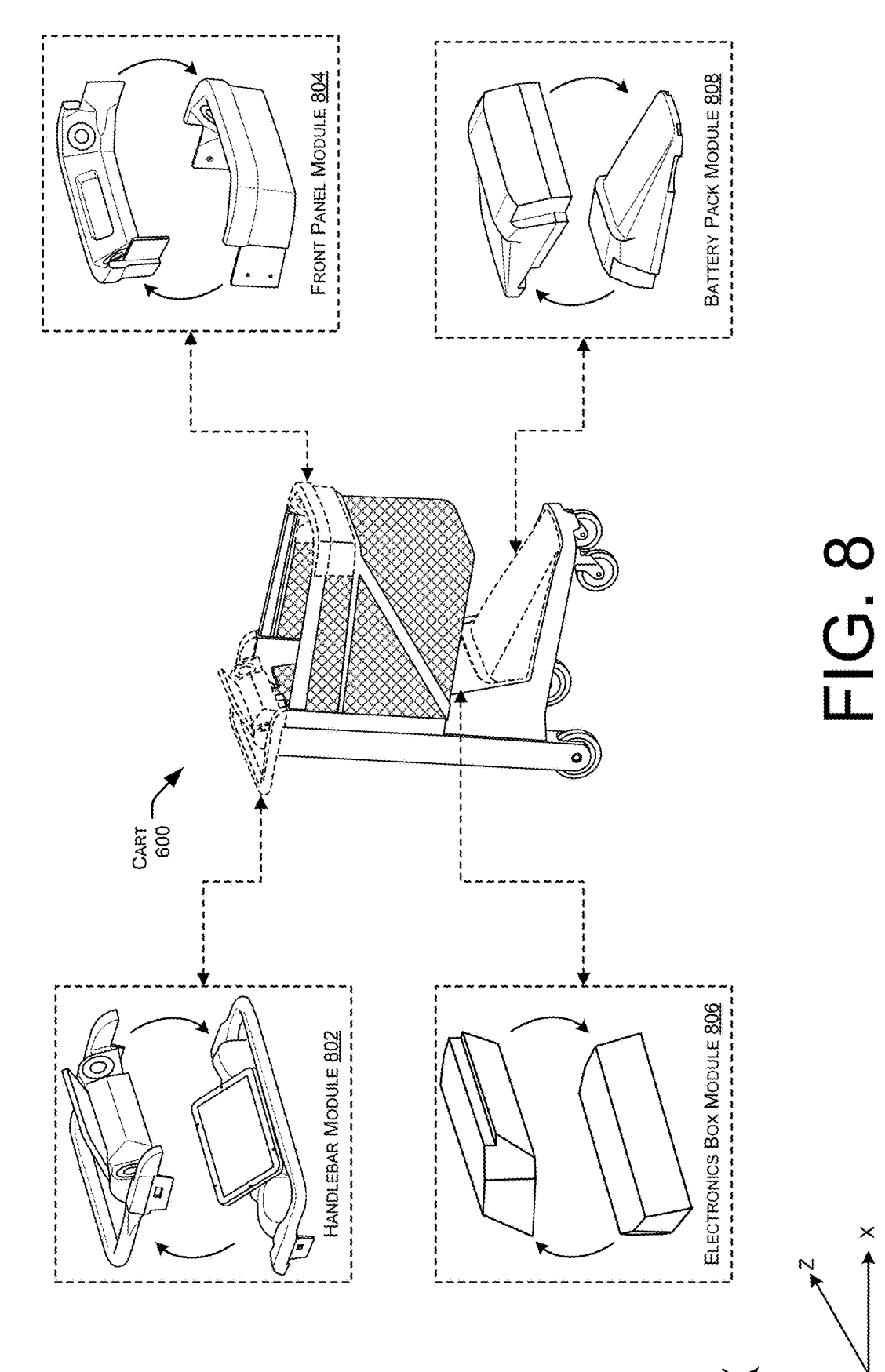
FIG. 8 illustrates perspective views of example perspective hardware components of an item-identifying cart.

FIG. 8 illustrates perspective views of example perspective hardware components of an item-identifying cart, such as the carts 104, 302, and/or 600. The illustrated components are merely examples of how the hardware and/or software components of the cart 104 may be arranged and designed, but other embodiments or examples are equally usable to implement the techniques described herein by the cart 600.

As shown, a handlebar module 802 may be positioned proximate the back of the cart 600 and may include at least two imaging devices 134, the display 136, and the handle 128. The handlebar module 802 may further include the first imaging device 134(1) and/or other components described above. For example, the handlebar module 402 may further include one or more microphones and one or more loud-speakers to facilitate dialogues with a user 108, and/or provide other auditory feedback and notifications. Although illustrated as having imaging devices 136 above the top of the basket, in some examples, the imaging devices may be positioned below the top of the basket. Additionally, in some examples the imaging devices 136 may be oriented such that their viewing frustum is facing downward into the basket.

The cart 600 may also include a front panel module 804 that includes two or more imaging devices 136 as illustrated. In some examples, the front panel module 804 may be mounted to the basket 126 of the cart 600 and have the handle 128(2) for pulling the front panel module 804 off the cart 600, as well as for pulling the cart along a surface. The front panel module 804 may be positioned such that the included imaging devices 134 are not occluded by other components of the cart 600.

The cart 104 also includes an electronics box module 806 that may include various electronic components, such as hardware and/or software components, of the cart 600. The electronics box module 806 may be coupled to the frame 124 and/or basket 126 in the illustrated location to help protect components from damage. In some examples, the electronics box module 806 may include hardware processor(s) for the cart 600, memory, software components, and/or other control circuitry for the cart 600. The electronics box module 806 may receive power from the battery pack module 138, and control how the power is distributed to the other components or modules of the cart 104 (e.g., using I2C connections). Components of the electronics box module 406 are described further with respect to FIG. 9.

Further, the cart 600 may include a battery pack module 808, which may be similar or the same as the battery pack module 138. In either instance, the battery pack module may include one or more batteries that power the technology (e.g., sensors, processing system, etc.) on the cart 600. The battery pack module 808 may include provisions for one or more batters, relevant electronics (e.g. interface, power distribution/management, etc.), an LED status indicator (e.g., illustrating battery/system health), and a wire harness that connects to the electronics box module 806. The battery pack module 808 may include the power distribution board that will regulate power from the battery(ies) provided to the electronics box module 806. In some examples, the cart 600 may also include one or more internal batteries and/or capacitors to "hot swap" the battery pack module 808 (e.g., temporarily power components of the cart 600 while battery pack modules 808 are swapped out on the cart 600 to replace a dead battery pack module 808 with a charged battery pack module 808).

Figure 9:
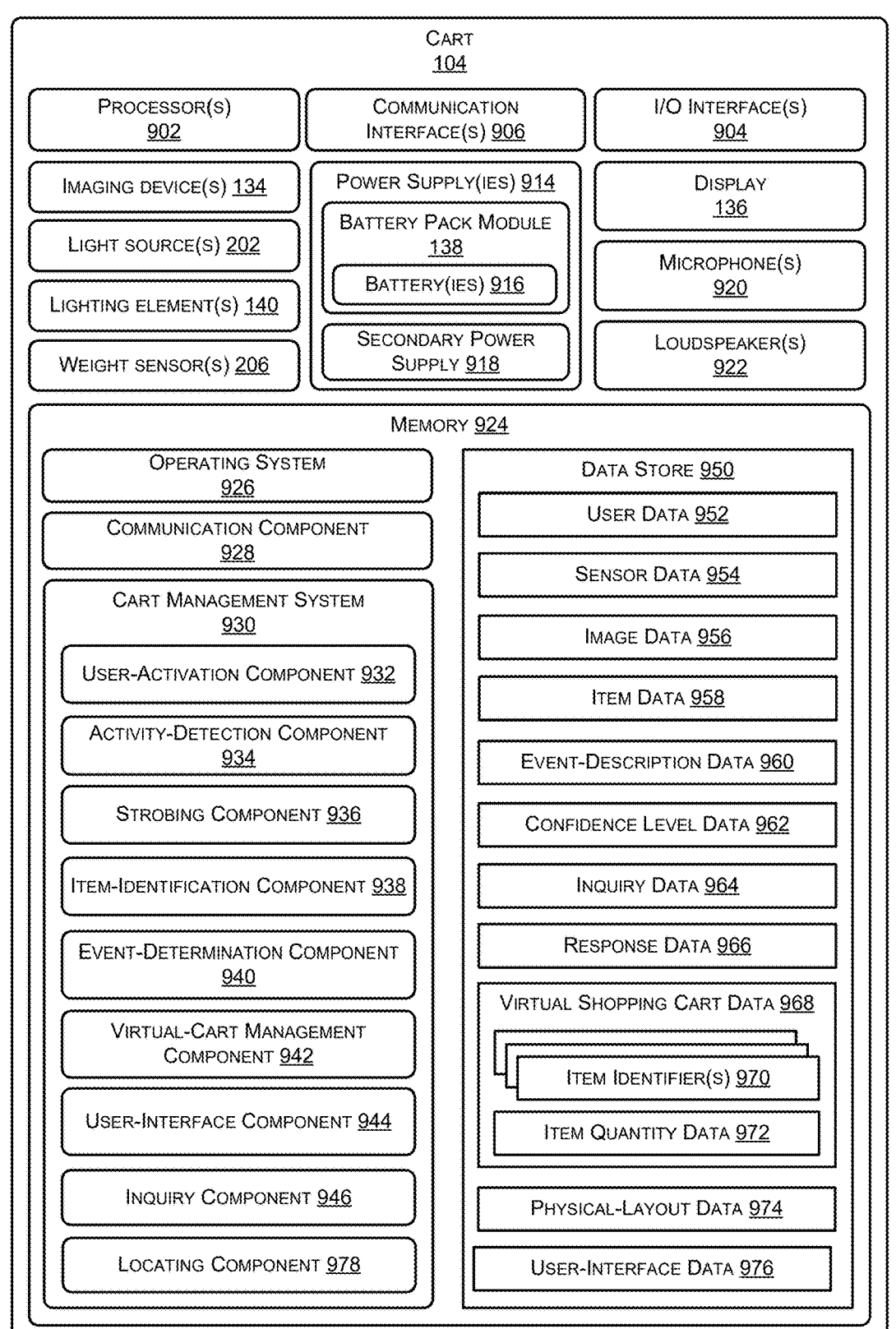
FIG. 9 illustrates example components of an item-identifying cart configured to support at least a portion of the functionality of a cart management system.

FIG. 9 illustrates example components of an item-identifying cart (e.g., carts 104, 302, and/or 600) configured to support at least a portion of the functionality of a cart management system.

The cart 104 may include one or more hardware processors 902 (processors) configured to execute one or more stored instructions. The processors 902 may comprise one or more cores. The cart 104 may include one or more input/output (I/O) interface(s) 904 to allow the processor 902 or other portions of the cart 104 to communicate with other devices. The I/O interfaces 904 may comprise Inter-Integrated Circuit (I2C), Serial Peripheral Interface bus (SPI), Universal Serial Bus (USB) as promulgated by the USB Implementers Forum, and so forth. The I/O interfaces 904 may allow the various modules/components (e.g., handlebar module 802, front panel module 804, electronics box module 806, battery pack module 808, etc.) to communicate with each other and/or control each other.

The cart 104 may also include one or more communication interfaces 906. The communication interfaces 906 are configured to provide communications between the cart 104 and other devices, such as the server(s) 120, sensors, interface devices, routers, and so forth. The communication interfaces 906 may include devices configured to couple to personal area networks (PANs), wired and wireless local area networks (LANs), wired and wireless wide area networks (WANs), and so forth. For example, the communication interfaces 906 may include devices compatible with Ethernet, Wi-Fi™, and so forth. The cart 104 may also include one or more busses or other internal communications hardware or software that allow for the transfer of data between the various modules and components of the cart 104.

The cart 104 may also include the one or more imaging devices 134, such as the first imaging device 134(1) for identifying a user operating the cart and one or more second imaging devices 134(2)-(N) and/or 310 for identifying items placed into and removed from a basket of the cart. The cart 104 may further include the light sources 202, the lighting elements 140, and the weight sensors 206 described above. In some instances, the cart 104 further includes include one or more proximity sensors 508 comprising any type of sensor that is able to detect the presence of nearby objects without the need for physical contact (e.g., ToF sensors, PIR sensors, etc.). The imaging devices, meanwhile, may comprise any type of camera or imaging device configured to generate image data (and/or video data) or information descriptive of a plurality of picture elements or pixels. Additionally, in some instances the cart 104 may include one or more imaging devices that are outward-facing and that generate image data representing the facility 102 around the cart 104.

The cart 104 may include one or more power supply(ies) 914 to provide power to the components of the cart 104, such as the battery pack module 138 (or 808). The power supply(ies) 914 may also include a secondary (e.g., internal) power supply 918 to allow for hot swapping of battery pack modules 138, such as one or more capacitors, internal batteries, etc.

The cart 104 may also include a display 136 configured to display image data, such as pictures, videos, user interface elements, and/or any other image data. The display 136 may comprise any type of display 136, and may further be a touch screen to receive touch input 108 from a user. The cart 104 may also include one or more microphones 920 and one or more loudspeakers 922 to facilitate a dialogue with a user 108, and/or to receive feedback from the user 108. The microphone(s) 920 may capture sound representing the user's speech, and the loudspeaker(s) 922 may output machine-generated words to facilitate a dialogue, prompt a user 108 for feedback on an item 106 and/or for other information, and/or output other alerts or notifications.

The cart 104 may include one or more memories 924 (e.g., in the electronics box module 806 along with the processor(s) 902). The memory 924 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 924 provides storage of computer-readable instructions, data structures, program modules, and other data for the operation of the cart 104. A few example functional modules are shown stored in the memory 924, although the same functionality may alternatively be implemented in hardware, firmware, or as a system on a chip (SOC).

The memory 924 may include at least one operating system (OS) component 526. The OS component 926 is configured to manage hardware resource devices such as the I/O interfaces 904, the communication interfaces 906, and provide various services to applications or components executing on the processors 902. The OS component 926 may implement a variant of the FreeBSD™ operating system as promulgated by the FreeBSD Project; other UNIX™ or UNIX-like variants; a variation of the Linux™ operating system as promulgated by Linus Torvalds; the Windows® Server operating system from Microsoft Corporation of Redmond, Washington, USA; and so forth.

One or more of the following components may also be stored in the memory 924. These components may be executed as foreground applications, background tasks, daemons, and so forth. A communication component 928 may be configured to establish communications with one or more of the sensors, one or more of the servers 120, or other devices. The communications may be authenticated, encrypted, and so forth.

The memory 924 may further store a cart management system 930. The cart management system 930 is configured to provide the item-identifying functions (and other functions) provided by the cart 104 as described herein. For example, the cart management system 930 may be configured to identify a user operating a cart, identify items 106 placed into the cart, and maintain a virtual shopping cart for a user 108 of the cart 104. While these components are described as operating on the cart 104, in some instances some or all of these components reside additionally or alternatively on the servers 120 or elsewhere.

The cart management system 930 may include a user-activation component 932 that performs operations for activating a shopping session using a cart 104 on behalf of a user 108. For instance, a user 108 may have previously registered for a user account with an operator of the facility to utilize various automated management services provided by an operator of the facility 102. The user 108 may have registered for a user account, such as by providing user data 952, to automate payments made for items taken by the user and included a payment means (e.g., credit card, bank account number, etc.), and may have also provided an identification means in the user data 952 to the user-activation component 932 such that the cart 104 can recognize the user 108. For instance, the user 108 may have registered to identify themselves to the cart 104 using any identification technique by the user-activation component 932, such as by providing user data 952 by presenting an identification means to the first imaging device 134(1) (e.g., presenting a driver's license, presenting a facility-issued card, presenting a user identifier via a mobile phone, etc.), speaking a predefined utterance that is captured by the microphone(s) 520 (e.g., a name of the user, a predefined keyword, etc.), and/or looking into a camera 520 for facial recognition. Once a user 108 has identified themselves to using the user-activation component 932, the user-activation component 932 may open a shopping session where the cart 104 identifies and track items 106 retrieved by the user 108 and placed in the cart 104.

The cart management system 930 may additionally include an activity-detection component 934 configured to detect items 106 (or objects) within a particular proximity to the cart. For example, one or more proximity sensor(s) (if present) may generate sensor data 954 that indicates a distance between the proximity sensor(s) 508 and any objects located in the FOV of the proximity sensor(s). The activity-detection component 934 may analyze the sensor data 954 and determine if an object is within a threshold distance indicating that the object is near the cart 104 and/or within or near the perimeter of the top of the basket 126 of the cart 104 (e.g., one foot from the proximity sensor(s), two feet from the proximity sensor(s), etc.). In this way, the proximity sensor(s) may generate sensor data 954 that indicates whether or not an item 106 is being moved in or out of the basket 126 of the cart 104. However, in some examples, rather than using sensor data 954 generated by a proximity sensor(s), the activity detection component 934 may utilize image data 956 generated by the imaging devices 134(2)-(N) to determine if an object is within a threshold distance from the cart 104.

The cart management system 930 may further include a strobing component 936 configured to cause the light sources 202 and/or shutters of the imaging devices 134 to strobe according to different frequencies. As noted above, the light sources 202 may emit light in any light spectrum (e.g., infrared, near infrared, visible, etc.). However, some items 106 may have text and/or other marking printed thereon using dye-based color inks that have diminished and/or similar near infrared (NIR) absorbance. This may lead to compromised contrast between, and essentially "washing out" of many distinct features in the visible spectrum when viewed in NIR. Accordingly, in some examples it may be advantageous to cause the light sources 202 to emit light in the visible spectrum. When generating image data 956 using the imaging devices 134, motion blur may appear when capturing fact moving objects. However, the motion blur may be reduced or eliminated by exposing the imaging device's imager for a short (e.g., sub-millisecond) durations. Accordingly, the strobing component 936 may strobe the opening and closing of shutters of the imaging devices 134 to limit the sensor exposure duration. Additionally, the strobing component 938 may cause the LEDs to emit/strobe light at a particular frequency, as discussed further with respect to FIG. 10. In some instances, the strobing component 938 may cause the LEDs to strobe at a first rate (e.g., 1200 hertz) prior to detecting predefined activity, such as a user placing an item into or removing an item from a cart, while causing the LEDs to strobe at a second, different rate (e.g., 60 hertz) upon identifying the predefined activity. Further, the LEDs may emit light in the visible range in some instances, and in the non-visible range in other instances. In some examples, the LEDs may comprise RGB LEDs that may be mixed according to different respective levels to tune a resulting color of the LEDs.

The cart management system 930 may also include an item-identification component 938 configured to analyze image data 956 to identify an item 106 represented in the image data 956. The image data 956 may comprise information descriptive of a plurality of picture elements, or pixels, for one or more image frames (e.g., a still picture, multiple picture frames, video frames, etc.). The item-identification component 938 may analyze the image data 956 using various image processing techniques, or computer vision techniques. For instance, the item-identification component 938 may extract a representation of an item 106 depicted in the image data 956 generated by at least one imaging device 134. The representation may include identifying text printed on the item 106, colors or color schemes printed in the item, determining 2-D and/or 3D shapes of the items 106, and/or other techniques for extract a representation of the item 106. In some instances, the representation of the item 106 depicted in the image data 956 may comprise a numeric representation, such as a feature vector or a set of feature vectors.

In some examples, a data store 950 stored in the memory 924 may include item data 958, which may include representations of the items 106 offered for acquisition at the facility 102. The item-identification component 938 may compare the extracted represented of the item 106 with the "gallery" or stored representations of the known items 106 in the item data 958. In some instance, the item representation may include an indication of a barcode or SKU data for the item 106 as recognized in, or extracted from, the image data 956. The item-identification component 938 may determine confidence level data 962 based on the comparisons with item representation in the item data 958. The item-identification component 938 may determine, and assign, confidence levels indicating how likely it is that the item 106 represented in the image data 956 corresponds to an item from the item gallery in the item data 958. Based on the confidence level data 962, the item-identification component 938 may determine an item identifier 970 for the item in the image data 956 (or multiple item identifiers 970) that corresponds to an item in the item data 958 to which the item 106 corresponds.

In some examples, the data store 950 may include physical-layout data 974 that is used by the item-identification component 938 to determine the item 106. The physical-layout data 974 may include or provide a mapping of physical locations within the physical layout of devices and objects such that the location of the cart 104 may be utilized to determine an item 106 stored nearby. The physical-layout data 974 may indicate the coordinates within the facility 102 of an inventory location 112, items 106 stored at that inventory location 112, and so forth. In examples where the cart 104 has location determining sensors (e.g., GPS, RFID, proximity, etc.), the location sensor data may be used to determine where in the store the user 108 is. In such examples, the item-identification component 938 may access the physical-layout data 974 to determine if a location associated with the event is associated with items 106, and confidence levels for the corresponding representations of items in the item data 958. Continuing the example above, given the location within the facility 102 of the event and image camera data, the physical-layout data 974 may determine the items 106 that may have been represented in generated images of the event 110.

The cart management system 930 may further include an event-determination component 940 to determine event-description data 960 for the item 106 in the image data 956. The event-determination component 940 may determine if the user 108 is adding an item 106 to the cart 104, removing the item from the cart 104, etc., based on movement of the item 106 and/or whether the item is shown in the image data 956. For instance, if the item 106 is shown as being moved downward towards the interior of the cart 104, and the user's hand 108 then leaves the basket without the item, 106 it can be determined that the user 108 added the item 106 to the cart 104. Similarly, if the user's hand 108 moves into the cart without an item 106 and is depicted in the image data 956 taking an item 106 from the cart, the event-determination component 940 may determine that the user 108 removed an item 106 from the cart 104.

The cart management system 930 may also include a virtual-cart management component 942 configured to manage virtual shopping cart data 968 for the cart 104. For instance, the virtual-cart management component 942 may utilize the item data 958, event-description data 960, and confidence level data 962 to add item identifier(s) 970 to the virtual shopping cart data 968 for items 106 that were added to the cart 104, remove item identifier(s) 970 from the virtual shopping cart data 569 for items 106 that were removed from the cart 104, and track item quantity data 972 indicating quantities of particular items 106 in the cart 104.

The cart management system 930 may further include a user-interface component 944 configured to present user interfaces on the display 136 based on user-interface data 976. The user interfaces 976 may include one or more fields to present data, and/or receive touch input (or other input via a keyboard, mouse, etc.) from a user 108. For instance, if the item-identification component 938 is unable to determine an item identifier 970 for an item 106 shown in the image data 956, the user-interface component 944 may receive inquiry data 964 generated by an inquiry component 946 to prompt a user 108 for feedback to help identify the item 106, and/or other information (e.g., if multiple items were placed in the cart 104). The inquiry component 946 may be configured to generate inquiry data 964 based on the information needed to identify the item 106. For instance, the inquiry data 964 may include a prompt to request particular feedback from the user 108, such as to provide input (e.g., touch input, vocal/utterance input, etc.) to identify the item 106, input to indicate how many items 106 were added to the cart, input to indicate whether an item 106 was removed or added, etc. In some examples, the user-interface component 944 may present one or more images depicting items from the item data 958 that have the highest confidence levels as corresponding tot eh item 106 in the image data 956, but confidence levels that are not high enough to make a final decision as to the item 106. For instance, the user-interface component 944 may present pictures of two different items that have high confidence levels 962 and request that the user 108 select or indicate the appropriate item 106. Additionally, or alternatively, the user-interface component 944 may present user-interface data 976 that prompts the user for feedback regarding whether or not the item 106 was added to, or removed from the cart 104.

In some examples, the cart management system 930 may further include a locating component 978 configured to determine locations of the cart 104 in the facility 102. For instance, the locating component 978 may analyze sensor data 954 collected by sensors of the cart 104 to determine a location. In some examples, the communication interface(s) 906 may include network interfaces that configured the cart 104 to receive or detect wireless signals (e.g., WiFi signals, Bluetooth signals, etc.) and generate sensor data 954 indicative of the signals. The locating component 978 may analyze the sensor data 954 using various techniques to identify the location of the cart 104, such as WiFi triangulation, received signal strength indicators (RSSI), and/or other methods for analyzing wireless signals to determine a location of the cart 104. In some instances, the facility 102 may include various infrared (IR) or near-IR emitters at different locations that emit light according to frequencies, patterns, etc. that indicate the different locations in the facility 102. In such examples, the cart 104 may include a light sensor to generate the sensor data 954 representing the IR or NIR and determine the location of the cart 104 in the facility. In some instances, there may be visible landmarks or markers throughout the facility that indicate a location in the facility, and the locating component 978 may analyze image data 956 generated by an outward facing camera to determine a location of the cart 104. As another example, there may be various radio frequency (RF) emitters positioned throughout the store, and the cart 104 may include an RF receiver to allow the locating component 978 to perform IR beaconing to determine the location of the cart 104. The locating component 978 may perform one, or any combination, of the above techniques to determine a location of the cart 104 in the facility and/or any other technique known in the art.

The locating component 978 may perform various operations based on determining the location of the cart 104 within the facility 102. For instance, the locating component 978 may cause user interface data 976 to be presented on the display 136 that includes a map of the facility 102 and/or directions to an item 106 for the user of the cart 104. Additionally, or alternatively, the locating component 978 may utilize the location of the cart, the physical-layout data 974, and/or item data 958 and "push" user interfaces to the display 136 that indicate various location-based information, such as indications of deals for items 106 located nearby, indications of items 106 located nearby and on the user's shopping list, and/or other user interface data 976.

Figure 10:
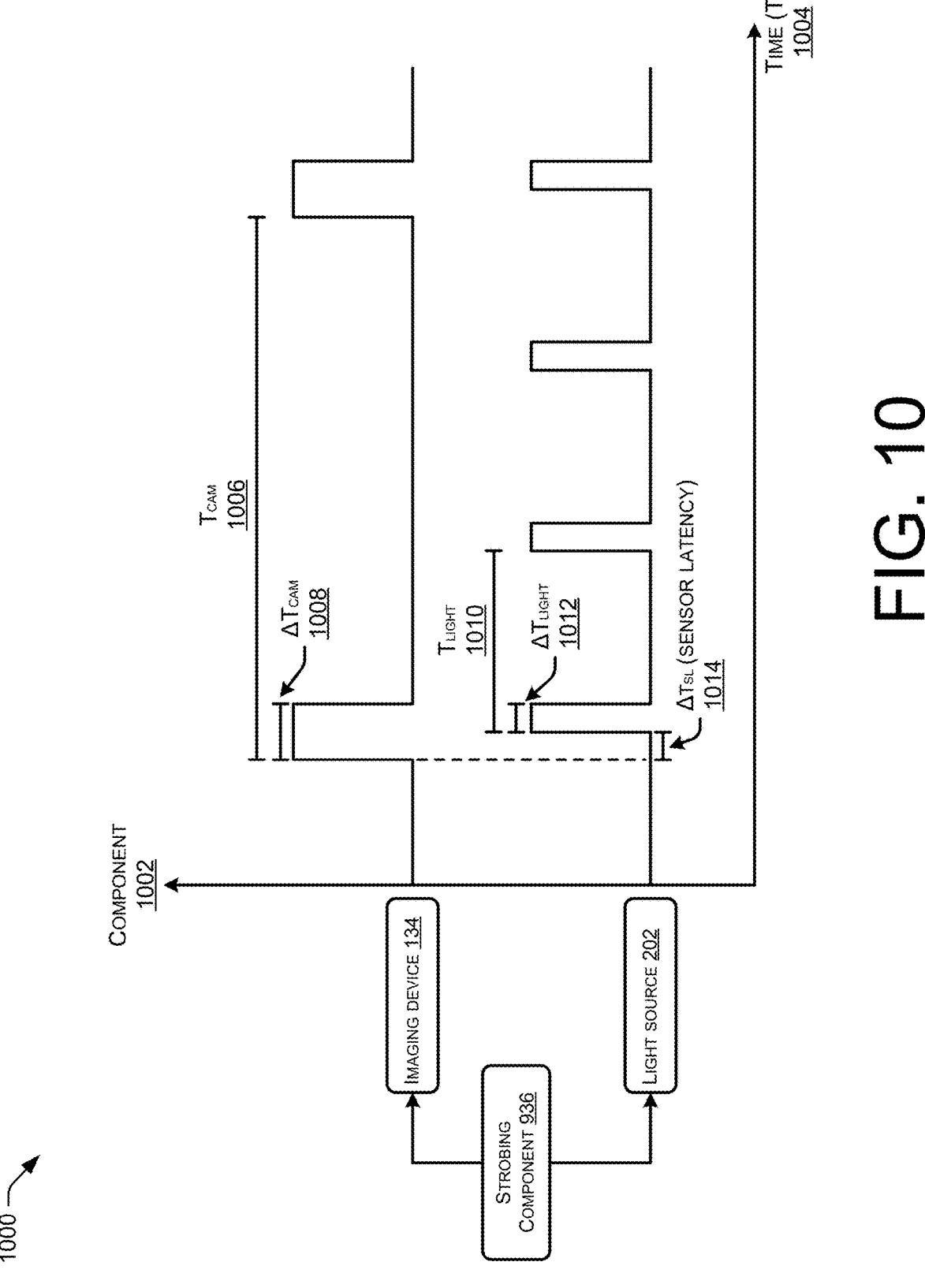
FIG. 10 illustrates an example timing diagram for strobing visible light from an LED and a camera shutter at respective strobe frequencies.

FIG. 10 illustrates an example timing diagram 1000 for strobing a light source 202 and an imaging device 134 shutter at respective strobe frequencies. As illustrated, the strobing component 936 may cause the strobing of the imaging device 134 shutter and the light source at different frequencies. As noted above, the light source 202 may emit light in any light spectrum (e.g., infrared, near infrared, visible, etc.). However, some items 106 may have text and/or other marking printed thereon using dye-based color inks that have diminished and/or similar near infrared (NIR) absorbance. This may lead to compromised contrast between, and essentially "washing out" of, many distinct features in the visible spectrum when viewed in NIR. Accordingly, in some examples it may be advantageous to cause the light source 202 to emit light in the visible spectrum. When generating image data 956 using imaging device 134, motion blur may appear when capturing fast moving objects. However, the motion blur may be reduced or eliminated by exposing the imaging device 134 imager for a short (e.g., sub-millisecond) durations. Accordingly, the strobing component 936 may strobe the opening and closing of shutters of the imaging device 134 to limit sensor exposure duration. Additionally, the strobing component 938 may cause the LEDs to emit/strobe light at a particular frequency.

As shown, the timing diagram illustrates the strobing frequency of components 1002 (e.g., imaging device 134 and light source 202) over time (T) 1004. Thus, the strobing component 936 causes the imaging device 134 shutter to open and close according to a frequency over time 1004 and causes at least one light source 202 to activate and deactivate according to a particular frequency over time. As illustrated, the imaging device 134 may have a frequency or capture cycle exposure between respective openings (or "pulses") of $T_{CAM}$ 1006, and is pulsed, or has its shutter open, for a $\Delta T_{CAM}$ 1008. Generally, to help reduce blur, the exposure time $\Delta T_{CAM}$ 1008 for the imager of the imaging device 134 may be relatively low to help reduce motion (e.g., 50 µs, 500 µs, 600 µs, etc.), additionally, to help reduce blur, the frequency at which the imaging device 134 is opened $T_{CAM}$ 1006 may be larger than the frequency at which the light source 202 is strobed $T_{LIGHT}$ 1010 (e.g., larger by a factor of 3 as illustrated).

Similarly, the strobing component 936 may cause the light source 202 to activate and deactivate according to a particular frequency. For instance, the light source 202 may have a strobing cycle of $T_{LIGHT}$ 1010 with a sensor latency from the initiation of $T_{CAM}$ 1006 of $\Delta T_{SL}$ 1014. Additionally, the light source 202 may have an emit time, or pulse time, of $\Delta T_{LIGHT}$ 1012.

In instances where the light source 202 emits visible light, it may be advantageous to strobe the light source 202 at frequencies at which humans do not perceive the strobing. For instance, when light sources 202 are strobed at lower frequencies that are perceptible to humans, the strobing of the light may induce seizures in some humans. Accordingly, to avoid seizure-inducing strobing of the light source 202, the strobing component 936 may cause the light source 202 to strobe visible light on and off at a high enough frequency to be imperceptible (e.g., greater than 90 Hz, in the range of 90 Hz-300 Hz, etc.).

In some examples, the light source 202 may be activated for a period of time $\Delta T_{LIGHT}$ 1012 that at least partially overlaps with the period of time $\Delta T_{CAM}$ 1008 the shutter of the imaging device 134 is open. In some examples, the period of time $\Delta T_{LIGHT}$ 1012 may be less than $\Delta T_{CAM}$ 1008, which may be due to sensor latency $\Delta T_{SL}$ 1014.

Figure 11:
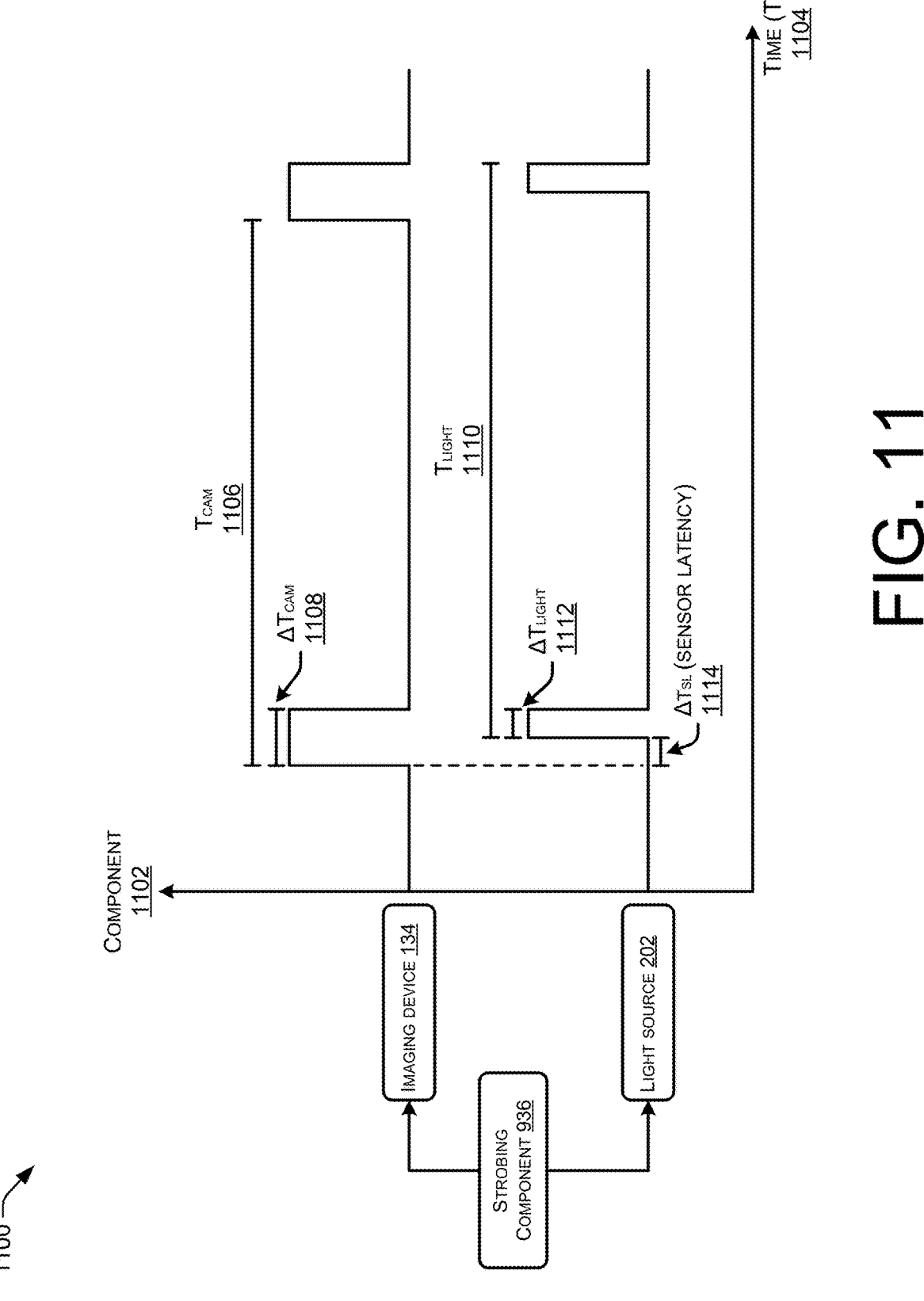
FIG. 11 illustrates another example timing diagram for strobing infrared or near-infrared light from an LED and a camera shutter at respective strobe frequencies.

FIG. 11 illustrates another example timing diagram 1100 for strobing infrared (IR) or near-infrared (NIR) light from a light source 202 and an imaging device 134 shutter at respective strobe frequencies. As illustrated, the strobing component 936 may cause the strobing of the imaging device 134 shutter and the light source 202 at the same frequency. Because IR and NIR light is not visible to humans, there is no concern of emitting light by the light source 202 at frequencies that are seizure inducing. Accordingly, the imaging device 134 may open and close the shutter according to a first frequency defined by a time period of $T_{CAM}$ 606, and is pulsed, or has its shutter open, for a $\Delta T_{CAM}$ 608. In instances where the light source 202 emits IR or NIR light, the light source 202 may also be strobed according to a same frequency that is defined by a time period of $T_{LIGHT}$ 1110 with a sensor latency from the initiation of $T_{CAM}$ 1106 of $\Delta T_{SL}$ 1114. Additionally, the light source 202 may have an emit time, or pulse time, of $\Delta T_{LIGHT}$ 1112. In various examples, the light source 202 may emit light during at least a portion of time $\Delta T_{CAM}$ 1108 when the shutter of the imaging device 134 is open.

FIG. 12 illustrates a flow diagram of an example process 1200 for an item-identifying cart to identify an item placed in the cart.

The process 1200, as well as each process described herein, may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

At 1202, the processor(s) 902 of the cart 104 may receive sensor data 954 generated by at least one sensor, such as a proximity sensor (e.g., a ToF sensor, a PIR sensor, and/or another proximity sensor), a camera, and/or the like. It is to be appreciate that while FIG. 12 illustrates one or more proximity sensors generating the data, in other instances the cart may be free from the proximity sensors and, thus, the sensor data from which activity is detected may be generated by one or more other sensors, as described in detail above and below.

At 1204, the processor(s) 902 of the cart 104 may detect, based at least in part on the sensor data 954, an item 106 moving through a perimeter of a top of a frame of the cart 104.

At 1206, the processor(s) 902 of the cart 104 may cause at least one light source to emit light. For instance, the processor(s) 902 of the cart 104 may cause the strobing component 936 to activate and deactivate (or pulse) an LED at a particular frequency. In some instances, the LED may be all LEDs on the cart, multiple LEDs, and/or a single LED (such as an LED in a capture assembly that includes an imaging device with a FOV that includes the item 106).

At 1208, the processor(s) 902 of the cart 104 may cause at least one imaging device 134 to generate image data 956. For instance, the processor(s) 902 of the cart 104 may cause the strobing component 936 to open and close the imaging device shutter at a particular frequency for predefined exposure periods.

At 1210, the processor(s) 902 of the cart 104 may determine, using the image data 956, an item identifier 970 associated with the item 106. For instance, the item-identification component 938 may extract feature data from the image data 958 and compare the feature data to representations of items in item data 958 for items 106 offered for acquisition in the facility 102. In some instances, the item data 956 that corresponds to the feature data for the item 106 in the image data 956 with the highest confidence level data 962 may have its respective item identifier 970 selected.

At 1212, the processor(s) 902 of the cart 104 may store an association between the item identifier 970 and a listing of previously stored item identifiers 970 for the cart 104. For instance, the virtual-cart management component 942 may determine that the user 108 added an item 106 to the cart 104 and add an item identifier 970 for the item 106 (or items), and also an item quaintly data 972 if multiple items were added.

FIG. 13 illustrates a flow diagram of another example process 1300 for identifying a user operating an item-identifying cart and an item placed into an item-identifying cart. At 1302, an item-identifying cart may cause a first imaging device of a cart to generate first image data. For example, a user operating the cart may press a physical or soft button, may issue a voice command, or may otherwise provide a command to cause the imaging device to generate the first image data. In other instances, the first imaging device may detect presence of an object and, in response, may generate the first image data. In either instance, the first imaging device may be positioned with an FOV directed towards the location of a user operating the cart.

At 1304, the cart or a remote server may determine that the first image data represents an identifier of the user operating the cart, such as a code (e.g., barcode) presented on a display of a mobile phone, or the like. In some instances, the cart and/or the remote server may identify an account of the user and may store an indication that the subsequent shopping session associated with the cart is to be associated with the identified account.

At 1306, the cart may cause at least one light source to emit light. As described above, the light source may periodically or continuously emit light during operation of the cart, or the light source may do so in response to a proximity sensor detecting an object. In either instance, at 1308 the cart may cause at least a second imaging device to generate second image data. In some instance, this may comprise instructing one or more of the second imaging devices 134(2)-(N) to generate the second image data.

At 1310, the cart or the remote server may determine that the second image data represents an item identifier associated with an item. For example, the second image data may be used to identify a barcode of the item, visual characteristics of the item, or the like, which in turn may be used by the item-identification component to determine an item identifier 970 of the item.

At 1312, the cart or the remote server may store an association between the item identifier and a virtual listing of item identifiers associated with the identified users. For example, the cart may indicate addition of an item identifier corresponding to the item placed in the cart in a virtual shopping cart of the user identified at 1304.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

Figure 14:
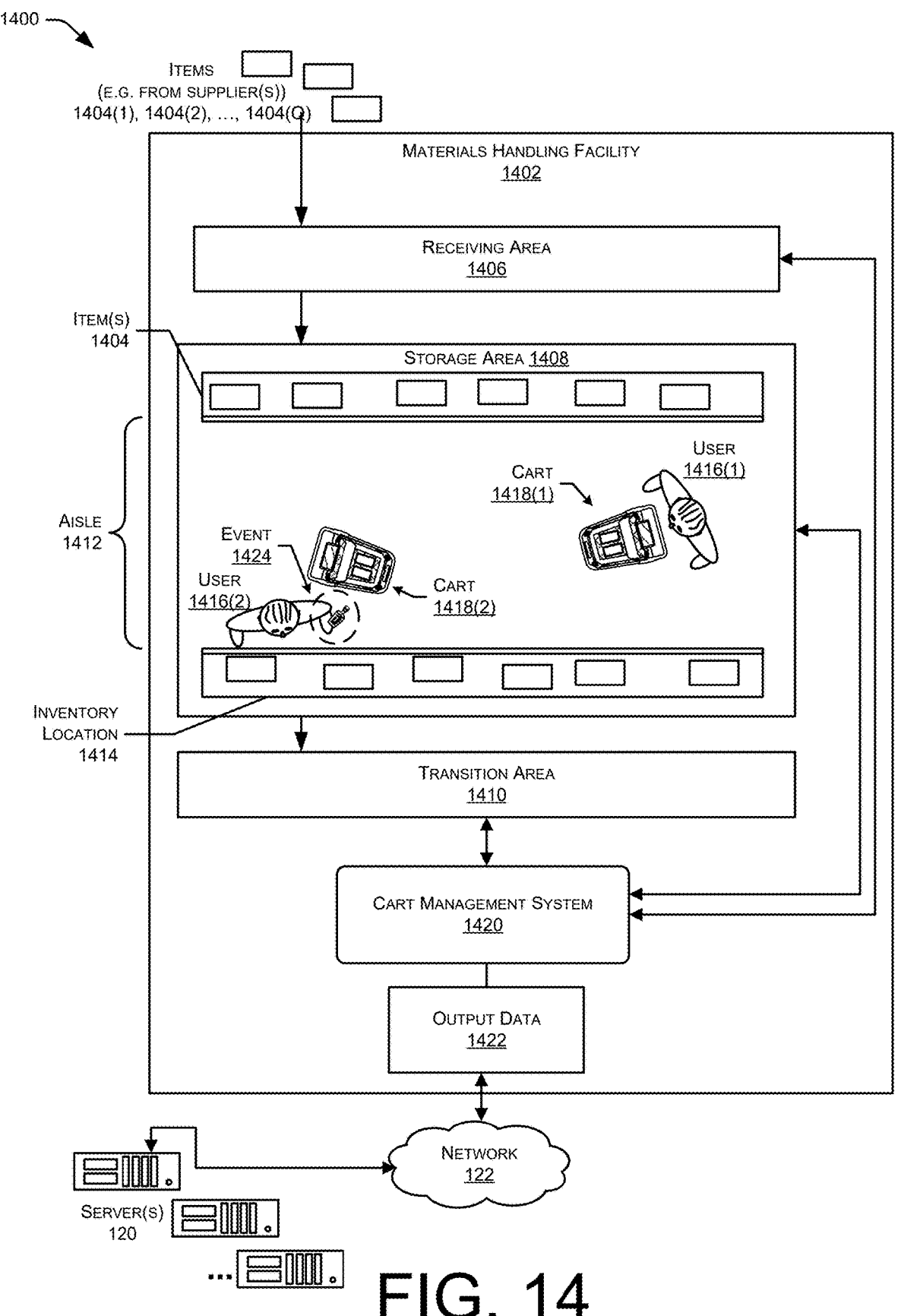
FIG. 14 is a block diagram of an example materials handling facility that includes item-identifying carts and a cart management system configured to generate output regarding events occurring in the cart using sensor data.

FIG. 14 is a block diagram 1400 of an example materials handling facility 1402 that includes item-identifying carts and a cart management system configured to generate output regarding events occurring in the cart using sensor data. However, the following description is merely one illustrative example of an industry and environment in which the techniques described herein may be utilized.

An implementation of a materials handling facility 1402 (e.g., facility 102) configured to store and manage inventory items is illustrated in FIG. 14. A materials handling facility 1402 (facility) comprises one or more physical structures or areas within which one or more items 1404(1), 1404(2), . . . , 1404(Q) (generally denoted as 1404) may be held. As used in this disclosure, letters in parenthesis such as "(Q)" indicate an integer result. The items 1404 comprise physical goods, such as books, pharmaceuticals, repair parts, electronic gear, groceries, and so forth.

The facility 1402 may include one or more areas designated for different functions with regard to inventory handling. In this illustration, the facility 1402 includes a receiving area 1406, a storage area 1408, and a transition area 1410. The receiving area 1406 may be configured to accept items 1404, such as from suppliers, for intake into the facility 1402. For example, the receiving area 1406 may include a loading dock at which trucks or other freight conveyances unload the items 1404.

The storage area 1408 is configured to store the items 1404. The storage area 1408 may be arranged in various physical configurations. In one implementation, the storage area 1408 may include one or more aisles 1412. The aisles 1412 may be configured with, or defined by, inventory locations 1414 on one or both sides of the aisle 1412. The inventory locations 1414 may include one or more of shelves, racks, cases, cabinets, bins, floor locations, or other suitable storage mechanisms for holding or storing the items 1404. The inventory locations 1414 may be affixed to the floor or another portion of the facility's structure, or may be movable such that the arrangements of aisles 1412 may be reconfigurable. In some implementations, the inventory locations 1414 may be configured to move independently of an outside operator. For example, the inventory locations 1414 may comprise a rack with a power source and a motor, operable by a computing device to allow the rack to move from one location within the facility 1402 to another.

One or more users 1416(1), 1416(2), . . . , 1416(U), carts 1418(1), 1418(2), . . . , 1418(T) (generally denoted as 1418) or other material handling apparatus may move within the facility 1402. For example, the users 1416 may move about within the facility 1402 to pick or place the items 1404 in various inventory locations 1414, placing them on the carts 1418 for ease of transport. An individual cart 1418 is configured to carry or otherwise transport one or more items 1404. For example, a cart 1418 may include a basket, a cart, a bag, and so forth. In other implementations, other agencies such as robots, forklifts, cranes, aerial drones, and so forth, may move about the facility 1402 picking, placing, or otherwise moving the items 1404.

One or more sensors may be configured to acquire information in the facility 1402. The sensors in the facility 1402 may include sensors fixed in the environment (e.g., ceiling-mounted cameras) or otherwise, such as sensors in the possession of users (e.g., mobile phones, tablets, etc.) or sensors mounted on the carts 1418. The sensors may include, but are not limited to, cameras, weight sensors (e.g., in the bottom of the carts 1418), radio frequency (RF) receivers, temperature sensors, humidity sensors, vibration sensors, and so forth. The sensors may be, in some examples, in or on the cart 1418 or another location in the facility 1402. In one example, the bottom of a basket of the carts 1418 may include weight sensors configured to determine a weight of the items 1404 placed thereupon.

During operation of the facility 1402, the sensors may be configured to provide information suitable for identifying the movement of items 1404 or other occurrences within the cart 1418. For example, a series of images acquired by a camera may indicate removal of an item 1404 from a particular cart 1418 by one of the users 1416 and/or placement of the item 1404 on or at least partially within one of the carts 1418.

While the storage area 1408 is depicted as having one or more aisles 1412, inventory locations 1414 storing the items 1404, sensors, and so forth, it is understood that the receiving area 1406, the transition area 1410, or other areas of the facility 1402 may be similarly equipped. Furthermore, the arrangement of the various areas within the facility 1402 is depicted functionally rather than schematically. For example, multiple different receiving areas 1406, storage areas 1408, and transition areas 1410 may be interspersed rather than segregated in the facility 1402.

The carts 1418 may include, or be coupled to, a cart management system 1420 (e.g., cart management system 930). The cart management system 1420 is configured to identify interactions with and between users 1416 and carts 1418, in one or more of the receiving area 1406, the storage area 1408, or the transition area 1410. These interactions may include one or more events 1424. For example, events 1424 may include placing of an item 1404 in a cart 1418, returning of an item 1404 from the cart 1418 to an inventory location 1414, and so forth. Other events 1424 involving users 1416 may include the user 1416 providing authentication information in the facility 1402, using a computing device at the facility 1402 to authenticate identity to the cart management system 1420, and so forth.

By determining the occurrence of one or more of the events 1424, the cart management system 1420 may generate output data 1422. The output data 1422 comprises information about the event 1424. For example, where the event 1424 comprises an item 1404 being removed from, or placed in, a cart 1418, the output data 1422 may comprise an item identifier indicative of the particular item 1404 that was removed from, or placed in, the cart 1418, a quantity of the item 1404, a user identifier of a user that removed the item 1404, and/or other output data 1422.

The cart management system 1420 may use one or more automated systems to generate the output data 1422. For example, an artificial neural network, one or more classifiers, or other automated machine learning techniques may be used to process the sensor data and/or image data from the one or more sensors to generate output data 1422. The automated systems may operate using probabilistic or non-probabilistic techniques. For example, the automated systems may use a Bayesian network. In another example, the automated systems may use support vector machines to generate the output data 1422 or the tentative results. The automated systems may generate confidence level data that provides information indicative of the accuracy or confidence that the output data 1422 or the tentative data corresponds to the physical world.

The confidence level data may be generated using a variety of techniques, based at least in part on the type of automated system in use. For example, a probabilistic system using a Bayesian network may use a probability assigned to the output as the confidence level. Continuing the example, the Bayesian network may indicate that the probability that the item depicted in the image data corresponds to an item previously stored in memory is 135%. This probability may be used as the confidence level for that item as depicted in the image data.

In another example, output from non-probabilistic techniques such as support vector machines may have confidence levels based on a distance in a mathematical space within which the image data of the item and the images of previously stored items have been classified. The greater the distance in this space from a reference point such as the previously stored image to the image data acquired during the occurrence, the lower the confidence level.

In yet another example, the image data of an object such as an item 1404 may be compared with a set of previously stored images. Differences between the image data and the previously stored images may be assessed. For example, differences in shape, color, relative proportions between features in the images, and so forth. The differences may be expressed in terms of distance with a mathematical space. For example, the color of the object as depicted in the image data and the color of the object as depicted in the previously stored images may be represented as coordinates within a color space.

The confidence level may be determined based at least in part on these differences. For example, the user 1416 may pick an item 1404(1) such as a perfume bottle that is generally cubical in shape from the inventory location 1414. Other items 1404 at nearby inventory locations 1414 may be predominately spherical. Based on the difference in shape (cube vs. sphere) from the adjacent items, and the correspondence in shape with the previously stored image of the perfume bottle item 1404(1) (cubical and cubical), the confidence level that the user 108 has picked up the perfume bottle item 1404(1) is high.

In some situations, the automated techniques may be unable to generate output data 1422 with a confidence level above a threshold result. For example, the automated techniques may be unable to distinguish which item 1404 in large a group of items a user 1416 has picked up from the inventory location 1414 and placed in the cart 1418. In other situations, it may be desirable to provide human confirmation of the event 1424 or of the accuracy of the output data 1422. For example, some items 1404 may be deemed age restricted such that they are to be handled only by users 1416 above a minimum age threshold.

In instances where human confirmation is desired, sensor data associated with an event 1424 may be processed to generate inquiry data. The inquiry data may include a subset of the sensor data associated with the event 1424. The inquiry data may also include one or more of one or more tentative results as determined by the automated techniques, or supplemental data. The subset of the sensor data may be determined using information about the one or more sensors. The subset of the sensor data may include images that may show the item 1404 being placed in, or removed from, the cart 1418. The subset of the sensor data may also omit images from other cameras that did not have that item 1404 in the field of view. The field of view may comprise a portion of the scene in the cart 1418 that the camera is able to generate sensor/image data about.

Continuing the example, the subset of the sensor data may comprise a video clip acquired by one or more cameras having a field of view that includes the item 1404. The tentative results may comprise the "best guess" as to which items 1404 may have been involved in the event 1424. For example, the tentative results may comprise results determined by the automated system that have a confidence level above a minimum threshold.

The facility 1402 may be configured to receive different kinds of items 1404 from various suppliers and to store them until a customer orders or retrieves one or more of the items 1404. A general flow of items 1404 through the facility 1402 is indicated by the arrows of FIG. 14. Specifically, as illustrated in this example, items 1404 may be received from one or more suppliers, such as manufacturers, distributors, wholesalers, and so forth, at the receiving area 1406. In various implementations, the items 1404 may include merchandise, commodities, perishables, or any suitable type of item 1404, depending on the nature of the enterprise that operates the facility 1402. The receiving of the items 1404 may comprise one or more events 1424 for which the cart management system 1420 may generate output data 1422.

Upon being received from a supplier at receiving area 1406, the items 1404 may be prepared for storage. For example, items 1404 may be unpacked or otherwise rearranged. An inventory management system of the facility 1402 may include one or more software applications executing on a computer system to provide inventory management functions based on the events 1424 associated with the unpacking or rearrangement. These inventory management functions may include maintaining information indicative of the type, quantity, condition, cost, location, weight, or any other suitable parameters with respect to the items 1404. The items 1404 may be stocked, managed, or dispensed in terms of countable, individual units or multiples, such as packages, cartons, crates, pallets, or other suitable aggregations. Alternatively, some items 1404, such as bulk products, commodities, and so forth, may be stored in continuous or arbitrarily divisible amounts that may not be inherently organized into countable units. Such items 1404 may be managed in terms of measurable quantity such as units of length, area, volume, weight, time, duration, or other dimensional properties characterized by units of measurement. Generally speaking, a quantity of an item 1404 may refer to either a countable number of individual or aggregate units of an item 1404 or a measurable amount of an item 1404, as appropriate.

After arriving through the receiving area 1406, items 1404 may be stored within the storage area 1408. In some implementations, like items 1404 may be stored or displayed together in the inventory locations 1414 such as in bins, on shelves, hanging from pegboards, and so forth. In this implementation, all items 1404 of a given kind are stored in one inventory location 1414. In other implementations, like items 1404 may be stored in different inventory locations 1414. For example, to optimize retrieval of certain items 1404 having frequent turnover within a large physical facility 1402, those items 1404 may be stored in several different inventory locations 1414 to reduce congestion that might occur at a single inventory location 1414.

When a customer order specifying one or more items 1404 is received, or as a user 1416 progresses through the facility 1402, the corresponding items 1404 may be selected or "picked" from the inventory locations 1414 containing those items 1404. In various implementations, item picking may range from manual to completely automated picking. For example, in one implementation, a user 1416 may have a list of items 1404 they desire and may progress through the facility 1402 picking items 1404 from inventory locations 1414 within the storage area 1408 and placing those items 1404 into a cart 1418. In other implementations, employees of the facility 1402 may pick items 1404 using written or electronic pick lists derived from customer orders. These picked items 1404 may be placed into the cart 1418 as the employee progresses through the facility 1402. Picking may comprise one or more events 1424, such as the user 1416 in moving to the inventory location 1414, retrieval of the item 1404 from the inventory location 1414, and so forth.

After items 1404 have been picked, they may be processed at a transition area 1410. The transition area 1410 may be any designated area within the facility 1402 where items 1404 are transitioned from one location to another or from one entity to another. For example, the transition area 1410 may be a packing station within the facility 1402. When the item 1404 arrives at the transition area 1410, the items 1404 may be transitioned from the storage area 1408 to the packing station. Information about the transition may be maintained by the cart management system 1420 using the output data 1422 associated with those events 1424.

In another example, if the items 1404 are departing the facility 1402 a list of the items 1404 may be used by the cart management system 1420 to transition responsibility for, or custody of, the items 1404 from the facility 1402 to another entity. For example, a carrier may accept the items 1404 for transport with that carrier accepting responsibility for the items 1404 indicated in the list. In another example, a customer may purchase or rent the items 1404 and remove the items 1404 from the facility 1402.

The cart management system 1420 may access or generate sensor data about the items 1404, the users 1416, the carts 1418, and so forth. The sensor data may be acquired by one or more of the sensors, data provided by other systems, and so forth. For example, the sensors may include cameras configured to acquire image data of items 1404 placed in the carts 1418. The image data may comprise still images, video, or a combination thereof. The image data may be processed by the cart management system 1420 to determine an item identifier for the items 1404, a listing of items in the cart 1418 for a user 1416, and so forth. As used herein, the identity of the user of a cart 1418 may represent a unique identifier of the user (e.g., name, number associated with user, username, etc.), an identifier that distinguishes the user amongst other users being identified with the environment, or the like.

The cart management system 1420, or systems coupled thereto, may be configured to identify the user 1416. In one implementation, this determination may comprise comparing sensor data with previously stored identity data. For example, the user 1416 may be identified by showing their face to a facial recognition system, by presenting a token carrying authentication credentials, providing a fingerprint, scanning a barcode or other type of unique identifier upon entering the facility, and so forth. Identity of the user 1416 may be determined before, during, or after entry to the facility 1402 and/or interaction with a cart 1418. Determination of the user's 1416 identity may comprise comparing sensor data associated with the user 1416 in the facility 1402 and/or with the cart 1418 to previously stored user data. In some examples, the output data 1422 may be transmitted over a network(s) 122 to server(s) 120.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

The invention claimed is:

1. A mobile cart comprising:
a frame comprising:
a bottom having a perimeter;
one or more sides coupled to and extending upward from the perimeter of the bottom, the bottom and the one or more sides defining a receptacle;
a camera coupled to the frame and directed at least partly towards the receptacle;
a display coupled to the frame;
one or more processors; and
one or more computer-readable media storing computer-executable instructions that, when executed, cause the one or more processors to:
receive first data indicating a user identifier for determining an identity of a user associated with the mobile cart;
cause the display to present second data based at least in part on determining the identity of the user from the user identifier;
cause the camera to generate image data; and
determine that the image data represents an item identifier associated with an item.

2. The mobile cart of claim 1, wherein the second data comprises second data identifying the user associated with the user identifier.

3. The mobile cart of claim 1, wherein the second data comprises second data identifying one or more items recommended for the user associated with the user identifier or one or more items associated with a shopping list of the user.

4. The mobile cart of claim 1, wherein the display comprises a touch screen to receive user input from the user associated with the mobile cart.

5. The mobile cart of claim 4, wherein the receiving the first data indicating the user identifier comprises receiving the first data using the touch screen.

6. The mobile cart of claim 1, further comprising one or more microphones, and wherein the receiving the first data indicating the user identifier comprises receiving the first data using the one or more microphones.

7. The mobile cart of claim 1, wherein the camera comprises a first camera and further comprising a second camera, and wherein the receiving the first data indicating the user identifier comprises receiving the first data using the second camera.

8. The mobile cart of claim 1, wherein the image data includes the item being placed in the receptacle, and wherein the one or more computer-readable media further store computer-executable instructions that, when executed, cause the one or more processors to generate an association between the item identifier and a virtual listing of item identifiers associated with the user associated with the mobile cart.

9. The mobile cart of claim 8, wherein the one or more computer-readable media further store computer-executable instructions that, when executed, cause the one or more processors to process the virtual listing of item identifiers based at least in part on a user account associated with the user upon detecting an end to a session associated with the user.

10. The mobile cart of claim 1, further comprising a weight sensor coupled to the frame, the weight sensor being configured to determine a current weight of items in the receptacle.

11. The mobile cart of claim 1, wherein the camera is a first camera, wherein the mobile cart further comprises a second camera directed substantially away from the receptacle, and wherein the one or more computer-readable media further store computer-executable instructions that, when executed, cause the one or more processors to cause the first camera to generate the first data.

12. The mobile cart of claim 1, further comprising a light source coupled to the frame and configured to emit light substantially towards the receptacle, and wherein the one or more computer-readable media further store computer-executable instructions that, when executed, cause the one or more processors to cause the camera to generate the image data at least partly while the light source emits the light.

13. A method implemented at least in part by a mobile cart comprising a frame defining a receptacle, a camera coupled to the frame and directed at least partly towards the receptacle, and a display coupled to the frame, the method comprising:
receiving first data indicating a user identifier for determining an identity of a user associated with the mobile cart;
causing the display to present second data based at least in part on determining the identity of the user from the user identifier;
causing the camera to generate image data; and
determining that the image data represents an item identifier associated with an item.

14. The method of claim 13, wherein the causing the display to present the second data comprises causing the display to present second data identifying the user associated with the user identifier.

15. The method of claim 13, wherein the causing the display to present the second data comprises causing the display to present second data identifying one or more items recommended for the user associated with the user identifier or one or more items associated with a shopping list of the user.

16. The method of claim 13, wherein the display comprises a touch screen to receive user input from the user associated with the mobile cart.

17. The method of claim 16, wherein the receiving the first data indicating the user identifier comprises receiving the first data using the touch screen.

18. The method of claim 13, wherein the mobile cart further comprises one or more microphones, and wherein the receiving the first data indicating the user identifier comprises receiving the first data using the one or more microphones.

19. One or more non-transitory computer-readable media storing computer-executable instructions that, when executed, cause one or more processors of a mobile cart to perform operations comprising:

receiving first data indicating a user identifier for determining an identity of a user associated with the mobile cart;

causing a display of the mobile cart to present second data based at least in part on determining the identity of the user from the user identifier;

causing a camera of the mobile cart to generate image data; and determining that the image data represents an item identifier associated with an item.

20. The one or more non-transitory computer-readable media of claim 19, wherein the one or more computer-readable media further store computer-executable instructions that, when executed, cause the one or more processors to generate an association between the item identifier and a virtual listing of item identifiers associated with the user associated with the mobile cart.

* * * * *